(12) United States Patent
Grundmueller et al.

(10) Patent No.: US 11,028,003 B2
(45) Date of Patent: Jun. 8, 2021

(54) METHOD AND DEVICE FOR LASER-BASED MACHINING OF FLAT SUBSTRATES

(71) Applicant: Corning Laser Technologies GmbH, Krailling (DE)

(72) Inventors: Richard Grundmueller, Lengenwang (DE); Helmut Schillinger, Munich (DE)

(73) Assignee: CORNING LASER TECHNOLOGIES GMBH, Krailling (DE)

( * ) Notice: Subject to any disclaimer, the term of this patent is extended or adjusted under 35 U.S.C. 154(b) by 419 days.

(21) Appl. No.: 14/761,275

(22) PCT Filed: Jan. 14, 2014

(86) PCT No.: PCT/EP2014/050610
§ 371 (c)(1),
(2) Date: Jul. 15, 2015

(87) PCT Pub. No.: WO2014/111385
PCT Pub. Date: Jul. 24, 2014

(65) Prior Publication Data
US 2015/0360991 A1    Dec. 17, 2015

Related U.S. Application Data

(60) Provisional application No. 61/752,489, filed on Jan. 15, 2013.

(30) Foreign Application Priority Data

Jan. 15, 2013 (EP) .................................. 13151296

(51) Int. Cl.
*C03B 33/09* (2006.01)
*B23K 26/53* (2014.01)
(Continued)

(52) U.S. Cl.
CPC ........ *C03B 33/091* (2013.01); *B23K 26/0006* (2013.01); *B23K 26/0613* (2013.01);
(Continued)

(58) Field of Classification Search
CPC .............. B23K 26/066; B23K 26/0643; B23K 26/0648; B23K 26/0734; B23K 26/53;
(Continued)

(56) References Cited

U.S. PATENT DOCUMENTS 1,790,397 A    1/1931   Woods et al.
2,682,134 A    6/1954   Stookey
(Continued)

FOREIGN PATENT DOCUMENTS

CN    2388062 Y    7/2000
CN    1283409 C    11/2006
(Continued)

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.
(Continued)

*Primary Examiner* — Dana Ross
*Assistant Examiner* — Kuangyue Chen
(74) *Attorney, Agent, or Firm* — Kevin L. Bray

(57) ABSTRACT

A method for laser-based machining of a flat substrate, to separate the substrate into a plurality of sections, in which the laser beam of a laser is directed at the substrate using an optical arrangement, which is positioned in the beam path of the laser. The optical arrangement forms a laser beam focal line that is extended as viewed along the beam direction and the substrate is positioned relative to the laser beam focal line such that an induced absorption is produced in the
(Continued)

Key: 1  Thermal diffusion
     2  Steel
     3  Glass material of the substrate along a section of the laser beam focal line that is extended as viewed in the beam direction.

39 Claims, 11 Drawing Sheets

(51) Int. Cl.
| | |
|---|---|
| *B23K 26/55* | (2014.01) |
| *B23K 26/00* | (2014.01) |
| *B23K 26/0622* | (2014.01) |
| *B23K 26/40* | (2014.01) |
| *B23K 26/06* | (2014.01) |
| *B23K 26/067* | (2006.01) |
| *C03B 33/02* | (2006.01) |
| *B23K 26/073* | (2006.01) |
| *B23K 103/00* | (2006.01) |

(52) U.S. Cl.
CPC ...... *B23K 26/0624* (2015.10); *B23K 26/0648* (2013.01); *B23K 26/0676* (2013.01); *B23K 26/0738* (2013.01); *B23K 26/40* (2013.01); *B23K 26/53* (2015.10); *B23K 26/55* (2015.10); *C03B 33/0222* (2013.01); *B23K 2103/50* (2018.08); *Y02P 40/57* (2015.11); *Y10T 428/24355* (2015.01); *Y10T 428/24471* (2015.01)

(58) Field of Classification Search
CPC ............ B23K 26/0057; B23K 26/0624; B23K 26/0006; B23K 26/006; B23K 26/0613; B23K 26/0676; B23K 26/0738; B23K 26/40; B23K 2203/50; B23K 26/067; B23K 26/38; B23K 26/0665; B23K 26/0604; B23K 26/064; B23K 26/0617; B23K 26/0087; B23K 26/06; B23K 26/0652; C08B 33/091; C03B 33/0222; Y10T 428/24355; Y10T 428/24471; Y02P 40/57; H01L 21/78; H01L 21/0268
USPC ............... 219/121.67–7, 121.72; 438/33, 68; 359/739; 216/65, 94
See application file for complete search history.

(56) References Cited

U.S. PATENT DOCUMENTS

| | | | |
|---|---|---|---|
| 2,749,794 | A | 6/1956 | O'Leary |
| 3,647,410 | A | 3/1972 | Heaton et al. |
| 3,695,497 | A | 10/1972 | Dear |
| 3,695,498 | A | 10/1972 | Dear |
| 3,729,302 | A | 4/1973 | Heaton |
| 3,775,084 | A | 11/1973 | Heaton |
| 4,226,607 | A | 10/1980 | Domken |
| 4,441,008 | A | 4/1984 | Chan |
| 4,546,231 | A | 10/1985 | Gresser et al. |
| 4,646,308 | A | 2/1987 | Kafka et al. |
| 4,764,930 | A | 8/1988 | Bille et al. |
| 4,891,054 | A | 1/1990 | Bricker et al. |
| 4,907,586 | A | 3/1990 | Bille et al. |
| 4,918,751 | A | 4/1990 | Pessot et al. |
| 4,929,065 | A | 5/1990 | Hagerty et al. |
| 5,035,918 | A | 7/1991 | Vyas |
| 5,040,182 | A | 8/1991 | Spinelli et al. |
| 5,104,210 | A | 4/1992 | Tokas |
| 5,108,857 | A | 4/1992 | Kitayama et al. |
| 5,112,722 | A | 5/1992 | Tsujino et al. |
| 5,114,834 | A | 5/1992 | Nachshon |
| 5,265,107 | A | 11/1993 | Delfyett, Jr. |
| 5,326,956 | A * | 7/1994 | Lunney ............... B23K 26/0734 219/121.69 |
| 5,400,350 | A | 3/1995 | Galvanauskas |
| 5,434,875 | A | 7/1995 | Rieger et al. |
| 5,436,925 | A | 7/1995 | Lin et al. |
| 5,553,093 | A | 9/1996 | Ramaswamy et al. |
| 5,574,597 | A | 11/1996 | Kataoka et al. |
| 5,586,138 | A | 12/1996 | Yokoyama |
| 5,676,866 | A | 10/1997 | in den Baumen et al. |
| 5,684,642 | A * | 11/1997 | Zumoto ............... B23K 26/032 359/739 |
| 5,696,782 | A | 12/1997 | Harter et al. |
| 5,736,709 | A | 4/1998 | Neiheisel |
| 5,776,220 | A | 7/1998 | Allaire et al. |
| 6,016,223 | A | 1/2000 | Suzuki et al. |
| 6,016,324 | A | 1/2000 | Rieger et al. |
| 6,033,583 | A | 3/2000 | Musket et al. |
| 6,038,055 | A | 3/2000 | Hansch et al. |
| 6,055,829 | A | 5/2000 | Witzmann et al. |
| 6,078,599 | A | 6/2000 | Everage et al. |
| 6,156,030 | A | 12/2000 | Neev |
| 6,160,835 | A | 12/2000 | Kwon |
| 6,186,384 | B1 | 2/2001 | Sawada |
| 6,210,401 | B1 | 4/2001 | Lai |
| 6,256,328 | B1 | 7/2001 | Delfyett et al. |
| 6,259,151 | B1 | 7/2001 | Morrison |
| 6,259,512 | B1 | 7/2001 | Mizouchi |
| 6,272,156 | B1 | 8/2001 | Reed et al. |
| 6,301,932 | B1 | 10/2001 | Allen et al. |
| 6,322,958 | B1 | 11/2001 | Hayashi |
| 6,339,208 | B1 | 1/2002 | Rockstroh et al. |
| 6,373,565 | B1 | 4/2002 | Kafka et al. |
| 6,381,391 | B1 | 4/2002 | Islam et al. |
| 6,396,856 | B1 | 5/2002 | Sucha et al. |
| 6,407,360 | B1 | 6/2002 | Choo et al. |
| 6,438,996 | B1 | 8/2002 | Cuvelier |
| 6,445,491 | B2 | 9/2002 | Sucha et al. |
| 6,449,301 | B1 | 9/2002 | Wu et al. |
| 6,484,052 | B1 | 11/2002 | Visuri et al. |
| 6,489,589 | B1 | 12/2002 | Alexander |
| 6,501,578 | B1 | 12/2002 | Bernstein et al. |
| 6,552,301 | B2 | 4/2003 | Herman et al. |
| 6,573,026 | B1 | 6/2003 | Aitken et al. |
| 6,592,703 | B1 | 7/2003 | Habeck et al. |
| 6,635,849 | B1 | 10/2003 | Okawa et al. |
| 6,635,850 | B2 | 10/2003 | Amako et al. |
| 6,720,519 | B2 | 4/2004 | Liu et al. |
| 6,729,161 | B1 | 5/2004 | Miura et al. |
| 6,744,009 | B1 | 6/2004 | Xuan et al. |
| 6,787,732 | B1 | 9/2004 | Xuan et al. |
| 6,800,237 | B1 | 10/2004 | Yamamoto et al. |
| 6,800,831 | B1 | 10/2004 | Hoetzel |
| 6,958,094 | B2 | 10/2005 | Ohmi et al. |
| 6,992,026 | B2 | 1/2006 | Fukuyo et al. |
| 7,009,138 | B2 | 3/2006 | Amako et al. |
| 7,353,829 | B1 | 4/2008 | Wachter et al. |
| 7,402,773 | B2 * | 7/2008 | Nomaru ............... B23K 26/0648 219/121.73 |
| 7,511,886 | B2 | 3/2009 | Schultz et al. |
| 7,535,634 | B1 | 5/2009 | Savchenkov et al. |
| 7,633,033 | B2 | 12/2009 | Thomas et al. |
| 7,642,483 | B2 | 1/2010 | You et al. |
| 7,649,153 | B2 | 1/2010 | Haight et al. |
| 7,726,532 | B2 | 6/2010 | Gonoe |
| 7,901,967 | B2 | 3/2011 | Komura et al. |
| 8,104,385 | B2 | 1/2012 | Hayashi et al. |
| 8,118,971 | B2 | 2/2012 | Hori et al. |
| 8,132,427 | B2 | 3/2012 | Brown et al. |
| 8,168,514 | B2 | 5/2012 | Garner et al. |
| 8,245,539 | B2 | 8/2012 | Lu et al. |
| 8,245,540 | B2 | 8/2012 | Abramov et al. |
| 8,269,138 | B2 | 9/2012 | Garner et al. |
| 8,283,595 | B2 | 10/2012 | Fukuyo et al. |
| 8,292,141 | B2 | 10/2012 | Cox et al. |
| 8,296,066 | B2 | 10/2012 | Zhao et al. |
| 8,327,666 | B2 | 12/2012 | Harvey et al. |
| 8,341,976 | B2 | 1/2013 | Dejneka et al. |
| 8,347,651 | B2 | 1/2013 | Abramov et al. |
| 8,358,888 | B2 | 1/2013 | Ramachandran |
| 8,444,906 | B2 | 5/2013 | Lee et al. |
| 8,448,471 | B2 | 5/2013 | Kumatani et al. |
| 8,518,280 | B2 | 8/2013 | Hsu et al. |

(56) References Cited

U.S. PATENT DOCUMENTS

| | | |
|---|---|---|
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0221615 A1 | 11/2004 | Postupack et al. |
| 2005/0024743 A1* | 2/2005 | Camy-Peyret ..... B23K 26/0617 359/719 |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo et al. |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Gluckstad |
| 2006/0289410 A1 | 12/2006 | Morita et al. |
| 2007/0068648 A1* | 3/2007 | Hu ..................... B22D 17/2209 164/92.1 |
| 2007/0111119 A1* | 5/2007 | Hu ......................... C22C 38/18 430/57.8 |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1* | 3/2011 | Lee .................. B23K 26/0604 264/400 |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0210105 A1* | 9/2011 | Romashko .......... B23K 26/042 219/121.72 |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |

(56) References Cited

U.S. PATENT DOCUMENTS

| | | | |
|---|---|---|---|
| 2014/0113797 | A1 | 4/2014 | Yamada et al. |
| 2014/0133119 | A1 | 5/2014 | Kariya et al. |
| 2014/0141217 | A1 | 5/2014 | Gulati et al. |
| 2014/0147623 | A1 | 5/2014 | Shorey et al. |
| 2014/0147624 | A1 | 5/2014 | Streltsov et al. |
| 2014/0165652 | A1 | 6/2014 | Saito |
| 2014/0174131 | A1 | 6/2014 | Saito et al. |
| 2014/0199519 | A1 | 7/2014 | Schillinger et al. |
| 2014/0216108 | A1 | 8/2014 | Wiegel et al. |
| 2014/0290310 | A1 | 10/2014 | Green |
| 2014/0320947 | A1 | 10/2014 | Egerton et al. |
| 2014/0333929 | A1 | 11/2014 | Sung et al. |
| 2014/0361463 | A1 | 12/2014 | DeSimone et al. |
| 2015/0034612 | A1 | 2/2015 | Hosseini et al. |
| 2015/0038313 | A1 | 2/2015 | Hosseini |
| 2015/0075221 | A1 | 3/2015 | Kawaguchi et al. |
| 2015/0075222 | A1 | 3/2015 | Mader |
| 2015/0110442 | A1 | 4/2015 | Zimmel et al. |
| 2015/0118522 | A1 | 4/2015 | Hosseini |
| 2015/0136743 | A1 | 5/2015 | Hosseini |
| 2015/0140241 | A1 | 5/2015 | Hosseini |
| 2015/0140735 | A1 | 5/2015 | Hosseini |
| 2015/0151380 | A1 | 6/2015 | Hosseini |
| 2015/0158120 | A1 | 6/2015 | Courvoisier et al. |
| 2015/0165548 | A1 | 6/2015 | Marjanovic et al. |
| 2015/0165560 | A1 | 6/2015 | Hackert et al. |
| 2015/0165562 | A1 | 6/2015 | Marjanovic et al. |
| 2015/0165563 | A1 | 6/2015 | Manley et al. |
| 2015/0166391 | A1 | 6/2015 | Marjanovic et al. |
| 2015/0166393 | A1 | 6/2015 | Marjanovic et al. |
| 2015/0166394 | A1 | 6/2015 | Marjanovic et al. |
| 2015/0166395 | A1 | 6/2015 | Marjanovic et al. |
| 2015/0166396 | A1 | 6/2015 | Marjanovic et al. |
| 2015/0166397 | A1 | 6/2015 | Marjanovic et al. |
| 2015/0183679 | A1 | 7/2015 | Saito |
| 2015/0232369 | A1 | 8/2015 | Marjanovic et al. |
| 2015/0299018 | A1 | 10/2015 | Bhuyan et al. |
| 2015/0360991 | A1 | 12/2015 | Grundmueller et al. |
| 2015/0367442 | A1 | 12/2015 | Bovatsek et al. |
| 2016/0008927 | A1 | 1/2016 | Grundmueller et al. |
| 2016/0009066 | A1 | 1/2016 | Nieber et al. |
| 2016/0023922 | A1 | 1/2016 | Addiego et al. |
| 2016/0031745 | A1 | 2/2016 | Ortner et al. |
| 2016/0060156 | A1 | 3/2016 | Krueger et al. |
| 2016/0279895 | A1 | 9/2016 | Marjanovic et al. |
| 2016/0280580 | A1 | 9/2016 | Bohme |
| 2016/0290791 | A1 | 10/2016 | Buono et al. |
| 2017/0169847 | A1 | 6/2017 | Tamaki |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102343631 A | 2/2012 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 3609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005135964 A | 5/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009056482 A | 3/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 101120471 B1 * | 3/2012 ......... B23K 26/0057 |
| KR | 2012074508 | 7/2012 |
| KR | 2013031380 | 3/2013 |

(56) References Cited

FOREIGN PATENT DOCUMENTS

| | | |
|---|---|---|
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 551-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Culling Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No.2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda, K. et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.

(56) References Cited

OTHER PUBLICATIONS

Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 396711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; p. 1-2; GTAT Corporation.
Xu, H. et al.; Optimization of 3D laser cutting head orientation based on minimum energy consumption; Int J Adv Manuf Technol; Jun. 28 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov et al., "Laser separation of chemically strengthened glass"; Physics Procedia 5 (2010) 285-290, Elsevier.; doi: 10.1016/j.phpro.2010.08.054.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens";Optic Letters, vol. 27, No. 4, pp-243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps. pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps. pulses"; Applied Physics A 69 [Suppl.], S883-S886, Springer-Verlag (1999); doi: 10.1007/s003399900300.
Perry et al., "Ultrashort-pulse laser machining"; URL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"Pharos High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

(56) References Cited

OTHER PUBLICATIONS

Kerr. "Filamentary tracks formed in transparent optical glass by laser beam self-focusing. II. Theoretical Analysis" Physical Review A. 4(3) 1971, pp. 1196-1218.

* cited by examiner

Key: 1 Thermal diffusion
2 Steel
3 Glass

Key: 1 Coming from 3
2 Transparent material

Key: 1 Coming from 3
2 Material transparent for λ

Key:  1   Coming from 11
      2   Material transparent for λ
      3   (i.e., l = L)
      4   (with l = L = d)

Key: 1   Var. z axis
        300-500 mm

METHOD AND DEVICE FOR LASER-BASED MACHINING OF FLAT SUBSTRATES

CROSS-REFERENCE TO RELATED APPLICATIONS

This application claims the benefit of priority under 35 U.S.C. § 371 of International Application Serial No. PCT/EP14/050610, filed on Jan. 14, 2014, which, in turn, claims the benefit of priority of U.S. Provisional Patent Application Ser. No. 61/752,489, filed on Jan. 15, 2013, and European Application Serial No. 13151296.4, filed on Jan. 15, 2015, the contents of which is relied upon and incorporated herein by reference in its entirety.

This invention concerns a method for laser-based machining of, preferably, flat substrates in accordance with the generic part of claim 1 and a corresponding device and the use of the method and devices in accordance with the invention. The method and the device have in particular the goal of separating flat substrates such as semiconductor wafers, glass elements, etc. (in particular of brittle materials) into a plurality of pieces (dicing the wafers or glass elements). As described below in more detail, as a rule a pulsed laser having a wavelength for which the materials are essentially transparent is used.

Devices and methods for separating such materials by means of a laser are already known from the prior art.

For one thing (for example, DE 10 2011 000 768 A1), one can use lasers that by virtue of their wavelength or their power are highly absorbed by the material or that make the material highly absorbing after the first interaction (heating, for example, with generation of charge carriers; induced absorption), and then can ablate the material. With many materials, these methods have disadvantages: for example, contaminations due to particle formation during ablation; cut edges can have microcracks because of heat input; cut edges can have melted margins; the kerf is not uniform over the thickness of the material (it has different widths at different depths; for example there may be wedge-shaped cutting notches). Since material must be evaporated or vaporized, a high average laser power must be made available.

For another thing, there are known laser methods for separating brittle materials that operate via a targeted, laser-induced crack formation. For example, Jenoptik offers a method in which at first a track is highly heated on the surface with the laser and immediately after that the track is cooled so quickly (for example with a water jet) that the thermal stresses generated by this lead to the formation of cracks that can be propagated through the thickness of the material (mechanical stresses) and separate the material.

Furthermore, there is a method that uses a laser at a wavelength for which the material is largely transparent, so that a focal point can be generated in the interior of the material. The intensity of the laser must be so high that internal damage takes place at this internal focal point in the material of the irradiated substrate.

The last mentioned methods have the disadvantage that the induced crack formation takes place at a point at a certain depth, or on the surface, so that the complete thickness of the material is only separated via an additional mechanical and/or thermally induced crack propagation. Since cracks tend to spread unevenly, the separation surface for the most part is quite rough and frequently must be subsequently machined. In addition, the same process must be repeatedly employed at different depths. This in turn slows the process rate by the corresponding factor.

Starting from the prior art, therefore, the problem of this invention is to make available a method (and a corresponding device), with which flat substrates, in particular brittle materials, can be machined, in particular completely separated, without particle formation, without melted edges, with minimal crack formation at the edge, without significant kerfs (thus material losses) with cut edges that are as straight as possible and at a high process rate.

This problem is solved by a method as in claim 1 and a device as in claim 11. Advantageous design variations and/or further developments of the method or the device can in each case be taken from the dependent claims. Important applications in accordance with the invention are described in claim 16. Glass objects made in accordance with the invention are described in claims 17 and 18.

This invention is described below, at first generally, and then in detail by means of a number of embodiment examples. The features shown together in combination in the individual embodiment examples do not, within the scope of the invention, all have to be put into practice. In particular, individual features can also be omitted or combined in other ways with other features presented in the same embodiment example or even in other embodiment examples. Also, individual features of an embodiment example by themselves can point to advantageous further developments of the prior art.

First, the basis of this invention (mechanism of the separation of the substrate into individual parts in accordance with the invention) is described below.

The method for separation in accordance with the invention generates a laser focal line (in contrast to a focal point) per laser pulse by means of an appropriate laser optics (also called optical arrangement in the following). The focal line determines the zone of interaction between the laser and the material of the substrate. If the focal line falls in the material to be separated, the laser parameters can be chosen so that an interaction takes place with the material that, in accordance with the invention, generates a cracking zone along the focal line. Important laser parameters here are the wavelength of the laser, the pulse duration of the laser, the pulse energy of the laser, and possibly also the polarization of the laser.

For the interaction of the laser light with the material, the following should preferably be specified in accordance with the invention:

1) The wavelength l of the laser is preferably chosen so that the material is essentially transparent at this wavelength (specifically, for example: absorption<<10% per millimeter of material depth=>$\gamma$<<1/cm; $\gamma$=Lambert-Beer absorption coefficient).

2) The pulse duration of the laser is preferably chosen so that no significant heat transport (thermal diffusion) can take place from the interaction zone outward during the interaction time (specifically, for example: $\tau$<<$d^2/\alpha$, d=focal diameter, $\tau$=laser pulse duration; $\alpha$=thermal diffusion constant of the material).

3) The pulse energy of the laser is preferably chosen so that the intensity in the interaction zone, thus in the focal line, generates an induced absorption that leads to local heating of the material along the focal line, which in turn leads to crack formation along the focal line as a consequence of the thermal stress induced in the material.

4) The polarization of the laser affects both the interaction at the surface (reflectivity) and the kind of interaction in the interior of the material during the induced absorption. The induced absorption can take place via induced, free charge carriers (typically electrons), either after thermal stimulation, or via multiphoton absorption and internal photo ionization, or via direct field ionization (field strength of the light ruptures electron bonds directly). The kind of generation of the charge carriers can be evaluated, for example, via the Keldysh parameter (reference), but it does not play any role in the use of the method in accordance with the invention. It may be important only for certain (for example, birefringent) materials that the additional absorption/transmission of the laser light be dependent on the polarization, and thus the polarization should be chosen by the user to be favorable for the separation of the relevant material by means of appropriate optics (phase plates), for example on a simply heuristic basis. Therefore, if the material is not optically isotropic, but rather is birefringent for example, the propagation of the laser light in the material will also be affected by the polarization. Thus, the polarization and orientation of the polarization vector can be chosen so that, as desired, only one focal line forms, and not two (ordinary and extraordinary beams). This does not play a role in the case of optically isotropic materials.

5) Furthermore, the intensity should be chosen via the pulse duration, the pulse energy, and the focal line diameter so that no ablation or melting takes place within the framework of the solid body, but rather only crack formation. For typical materials like glass or transparent crystals, this requirement is most easily satisfied with pulsed lasers in the subnanosecond range, in particular therefore with pulse durations of, for example, between 10 and 100 ps. In this regard, see also FIG. 1: Over scale lengths of about one micrometer (0.5 to 5.0 micrometers, see middle of figure), for poor heat conductors such as glass, heat conduction has an effect up to the submicrosecond region (see the region between the two lines), while for good heat conductors like crystals and semiconductors, heat conduction already becomes effective beginning as of nanoseconds.

In accordance with the invention, the important process for crack formation extended vertically to the substrate plane is mechanical stress that exceeds the structural strength of the material (compressive strength in MPa). The mechanical strength here is produced by the laser energy via rapid, inhomogeneous heating (thermally induced stress). Crack formation in accordance with the invention naturally starts, assuming an appropriate positioning of the substrate relative to the focal line (see below), on the surface of the substrate, since the deformation is the highest there. This is because in the half-space above the surface there is no material that can receive a force. This argument also applies to materials with hardened or prestressed surfaces, as long as the thickness of the hardened or prestressed layer is large compared to the diameter of the abruptly heated material along the focal line. (In this regard see also FIG. 2, described below.)

The kind of interaction can be established via the fluence (energy density in joules per $cm^2$) and the laser pulse duration for the selected focal line diameter so that 1) preferably no melting takes place on the surface or in the interior of the material and 2) preferably no ablation with particle formation takes place on the surface. A number of types of induced absorption are known in the essentially transparent materials:

a) In semiconductors and insulators with low band gaps, a rapid heating within a first fraction of the laser pulse duration leads to thermal stimulation of additional charge carriers, which in turn leads to higher absorption and as a result to avalanche accretion of the laser absorption in the focal line via, for example, low residual absorption (due to traces of contaminants in the material or already thermally stimulated charge carriers at the temperature before the laser machining).

b) In insulators, if there is sufficient light intensity, photoabsorption will lead to an ionization via a nonlinear optical interaction with the atoms of the material and thus in turn to generation of free charge carriers and as a result to higher linear absorption of the laser light.

The generation of the geometry of a desired separation surface (relative motion between laser beam and substrate along a line on the substrate surface) is described below.

The interaction with the material in accordance with the invention generates a single continuous (as viewed in the direction perpendicular to the substrate surface) cracking zone in the material along a focal line per laser pulse. For the complete separation of the material, a succession of these cracking zones is established so closely to each other along the desired separation line per laser pulse that a lateral connection of the cracks to a desired cracking surface/contour in the material results. For this, the laser is pulsed at a specific repetition rate. The spot size and spacing are chosen so that on the surface along the line of the laser spot a desired, directed crack formation ensues. The spacing of the individual cracking zones along the desired separation surface results from the movement of the focal line relative to the material in the time span from laser pulse to laser pulse. In this regard see also FIG. 9, described below.

To generate the desired separation surface in the material, either the pulsed laser light can be moved over the stationary material with an optical arrangement that can be moved parallel to the substrate plane (and optionally also perpendicular to it), or the material itself is moved with a movable holder to the stationary optical arrangement so that the desired separation line is formed. The orientation of the focal line to the surface of the material, whether perpendicular or at an angle of $90°-\beta$ to the surface, can either be fixedly chosen, or can be altered by means of a rotatable optical arrangement (also called the optics below for simplicity) and/or a rotatable laser beam path along the desired separation line.

Overall, the focal line for formation of the desired separation line can be guided through the material in up to five separately movable axes: two spatial axes (x, y), which fix the entry point of the focal line into the material, two angular axes (theta, phi), which fix the orientation of the focal line from the entry point into the material, and an additional spatial axis (z', not necessarily orthogonal to x, y), which fixes how deep the focal line penetrates into the material from the entry point at the surface. For the geometry in Cartesian coordinates (x, y, z) see also, for example, FIGS. 5a and 6, described below. In the case of perpendicular incidence of the laser beam on the substrate surface ($\beta=0°$), $z=z'$.

As a rule, there are limitations that result from the optics and the laser parameters: the orientation of the angles theta and phi can take place only to the extent that the refraction of the laser light in the material allows this (less than the angle of total reflection in the material), and the depth of penetration of the laser focal line is limited by the available laser pulse energy and the correspondingly selected laser optics, which form only one length of the focal line, which can generate the cracking zone in accordance with the invention with the available laser pulse energy.

One possible design for moving the focal line in all five axes can, for example, consist of moving the material in coordinates x, y on a driven rotary tilting table, while the focal line is moved via a galvoscanner and a non-telecentric F-theta lens in the field of the lens relative to the lens center in coordinates x', y' and is tilted by the angles theta and phi. The coordinates x and x' and y and y' can be computed so that the focal line is aimed at the desired incidence point on the material surface. The galvoscanner and F-theta lens are additionally affixed to a z axis orthogonal to the x, y plane of the rotary tilting table, which determines the position of the focal line perpendicular to the material (depth of the focal line in the material).

The last step of the separation of the substrate into the plurality of pieces is described below (separation or dicing).

The separation of the material along the generated cracking surface/contour takes place either through the inherent stress of the material or through introduced forces, for example mechanical (stress) or thermal (uneven heating/cooling). Since in accordance with the invention no material is ablated, as a rule there is initially not a continuous gap in the material, but rather only a highly distorted fracture surface (microcracks), which interlocks and possibly is still connected by bridges. Through the subsequently introduced forces, the remaining bridges become separated via lateral crack growth (taking place parallel to the substrate plane) and the interlocking breaks down, so that the material can be separated along the separation surface.

The important features of a method in accordance with the invention and a device in accordance with the invention are described below by means of the patent claims.

Claim 1 describes the important features of a method in accordance with the invention, and claim 11 describes the important components of a device made to conduct the method in accordance with the invention.

The laser beam focal line described in claims 1 and 11 and generated by means of the optical arrangement is also alternatively simply called, both above and below, the focal line of the laser beam. In accordance with the invention, the substrate is separated or diced into the plurality of pieces through the crack formation in accordance with the invention (induced absorption along the focal line extended perpendicular to the substrate plane), as viewed in the substrate plane. The crack formation in accordance with the invention thus takes place perpendicular to the substrate plane into the substrate or into the interior of the substrate (lengthwise crack formation). As already described, as a rule a plurality of individual laser beam focal lines must be introduced into the substrate along a line on the substrate surface to be able to separate the individual pieces of the substrate from each other. For this, either the substrate can be moved parallel to the substrate plane relative to the laser beam or the optical arrangement or, conversely, the optical arrangement can be moved parallel to the substrate plane relative to the fixed substrate.

Advantageously, in accordance with the invention, the features of at least one of the dependent method or device claims are additionally implemented. In this case, the features of a plurality of dependent claims can also be implemented in any combination.

If a method is implemented in accordance with claim 2, the extended segment of the induced absorption in the interior of the substrate extends from one surface of the substrate down to a defined depth in the substrate (or even beyond that). The extended segment of the induced absorption can comprise the entire substrate depth from one surface to the other. It is also possible to generate lengthwise extended segments of the induced absorption only in the interior of the substrate (without the surfaces of the substrate also being included).

Other advantageously implementable features can be taken from claim 3 (see also FIG. 3*b*, described below). The extended segment of the induced absorption (thus, for example, crack length introduced perpendicular to the substrate plane) can thus extend both from a point in the interior of the substrate along the extended segment of the induced absorption down to the back-side surface of the substrate or even, for example, extend from the front-side surfaces of the substrate down to a point in the interior of the substrate. The layer thickness d is in each case measured perpendicular to the two opposite substrate surfaces of the flat substrate (even if the laser beam is directed at an angle $\beta > 0°$ to the normal to the substrate surface, thus in the case of slanting incidence).

In claim 3 as well as in all of the other claims, the said range limits each include the indicated upper and lower limiting value.

In accordance with the invention, the induced absorption is advantageously generated in accordance with claim 4. This takes place by setting the already described laser parameters, which are further explained below within the scope of examples and also are mentioned in the dependent claims 5 to 7, the parameters of the optical arrangement, and the geometric parameters of the arrangement of the individual elements of the device in accordance with the invention. Basically, any combination of features of the parameters as indicated in claims 5-7 is possible. In claim 6, $\tau \ll \delta^2/\alpha$ means that $\tau$ is less than 1%, preferably less than 1‰ of $\delta^2/\alpha$. For example, the pulse duration $\tau$ can be 10 ps (or even less), between 10 and 100 ps, or even more than 100 ps. An Er:YAG laser with a wavelength between 1.5 and 1.8 µm is preferably used for the separation of Si substrates. Generally speaking, a laser with a wavelength that is chosen so that the photon energy is less than the band gap of the semiconductor is preferably used for semiconductor substrates.

Advantageous beam directions in accordance with the method of the invention for beaming the laser beam onto the substrate (which then also define the orientation of the laser beam focal line relative to the substrate plane) can be taken from claim 8.

The additional process steps that may still be necessary for the final separation or dicing of the substrate into a plurality of pieces are described in the dependent claims 9 and 10. As already noted, either the substrate is moved relative to the optical arrangement (including the laser) or the optical arrangement (including the laser) is moved relative to the substrate. The crack formation claimed in claim 10 is to be understood (in contrast to the essential, induced crack formation in accordance with the invention) as a transverse crack, thus, as a lateral crack formation in a direction lying in the plane of the substrate (in correspondence with the course of the line along which the substrate is to be separated).

Advantageous developments of a device in accordance with the invention according to claim 11, which describes in particular different possible designs of the optical arrangement for generation and positioning of the laser beam focal line, can be taken from the dependent claims 12 to 15. In this regard see also the embodiment examples below and FIGS. 3*a*, 4, 5*a*, 5*b*, 6, 7, and 8. The convex lens in accordance with claim 11 can in particular be a planoconvex lens.

Important applications in accordance with the invention (more are described below) can be taken from claim 16.

Additionally claimed in accordance with claim 17 are: a glass object having one or more flat areas (in particular, one or more surfaces). Along at least one of the one or more surfaces there is in each case a plurality of material modifications present, where each of the material modifications has a length in the range between 0.1 mm and 100 mm and an average diameter in the range between 0.5 μm and 5 μm.

Additionally claimed in accordance with claim 18 are: a glass object having one or more flat areas (in particular one or more surfaces). Along at least one of the one or more surfaces there is at least a plurality of material modifications present. Each of the material modifications has a ratio $V3=\alpha/\delta$, the average spacing a of the immediately adjacent material modifications and the average diameter δ of a laser beam focal line that generated the material modifications, of roughly 2.0.

In contrast to the methods or devices known from the prior art, the present invention has a number of important advantages.

First, in accordance with the invention, the cut takes place without particle formation, without melted edges, with minimal cracking at the edge, without a significant kerf (thus without loss of substrate material), and with straight cut edges. The cut can be established either perpendicular (as viewed toward the substrate plane) or at an angle β relative to the substrate normal, as desired by the user.

In accordance with the invention, a very high average laser power is not necessary, but nevertheless relatively high separation speeds can be achieved. It is important in this case that the invention generate one laser beam focal line (and not merely a focal point that is not extended or only locally extended) per laser pulse (or per burst pulse). The laser optics, which are shown below in detail, are used for this. The focal line thus determines the zone of interaction between laser and substrate. If the focal line falls at least section-wise (as viewed in the direction of depth) in the substrate material that is to be separated, the laser parameters can be selected so that an interaction with the material takes place that generates, in accordance with the invention, a cracking zone along the entire focal line (or along the entire extended segment of the laser beam focal line that falls in the substrate). Selectable laser parameters are, for example, the wavelength of the laser, the pulse duration of the laser, the pulse energy of the laser, and also possibly the polarization of the laser.

Besides the absence of particle formation (or at least minimal particle formation), other advantages that the method in accordance with the invention has over, for example, mechanical scoring and breaking, are the fact that in contrast to a mechanical scoring line, a high aspect ratio (width to depth) can be achieved. While in the case of mechanical scoring and breaking the fracture line is produced in the material through largely uncontrollable crack growth, in accordance with the invention a separation takes place at a very precisely establishable angle β to the substrate normal. Thus in accordance with the invention there is no directional dependency of the cutting direction and angular cuts are easily possible.

Also, in comparison with the generation of punctiform (focused) defects by punctiform focusing of the laser on the surface or even in the interior of the substrate material and a subsequent breaking after setting such punctiform foci at different material depths, this invention has in particular the advantage that a clearly higher cut aspect ratio can be achieved. The problems of those known methods that arise because of less directed crack formation, in particular in the case of thicker substrates, are thus avoided. Also, the machining rate, in particular with thicker substrates (in which a multiple setting of punctiform damages at different substrate depths from the surface down to the underside of the substrate is necessary at a specific position in the substrate plane), is increased many times over.

Ablation on the surface, feathering on the surface, and particle formations are avoided (the latter in particular when the position of the focal line relative to the substrate is set so that the method of the invention provides for the extended induced absorption and crack formation of the invention from the surface of the substrate going into the interior of the substrate). In this case, the first (intentional) damage thus takes place directly on the surface and progresses in a specific manner and way along the crack formation zone into the substrate depth due to induced absorption.

Various materials, in particular glass disks, sapphire disks, semiconductor wafers, etc., can be machined in accordance with the invention. Both individual layers of the corresponding materials as well as layer sandwiches (stacks of a number of individual substrate layers) can be machined. The focal line can be positioned and directed so that even within a stack only one specific layer becomes separated. Differing sandwiches of layer stacks can be machined: glass-air-glass sandwiches, glass-film-glass sandwiches, glass-glass sandwiches. Thus, the selective cutting of individual positions even within a stack is just as possible as the separation of intermediate layers (for example films or adhesive film).

Already coated materials (for example AR coated, TCO coated) or even substrates printed nontransparently on one side can also be machined and separated in accordance with the invention.

In accordance with the invention, free form cuts are possible without the geometry being limited by crack formation in the substrate. Thus, nearly any free form cuts can be made in transparent media (the cut direction is not directionally dependent). Thus, angular cuts can be made in the substrate, for example with angles of attack that have angles up to β=30° or β=45° from the normal.

In accordance with the invention, a cutting practically without a kerf is possible: only material damage that as a rule lies in a range between 1 and 10 μm extent is produced. Thus, in particular no cutting loss with respect to material or area is generated. This is especially advantageous in the cutting of semiconductor wafers, since cut losses would reduce the actively usable area of the wafer. Through the method in accordance with the invention, the focal line cutting thus produces an increased area yield. The absence of material loss is in particular also advantageous in the cutting of gemstones (for example diamond): while the area of use of this invention is preferably the cutting or separation of flat substrates, nonflat substrates or workpieces can also be machined in accordance with the invention.

The method in accordance with the invention can also be used in particular in the inline operation of production processes. This takes place particularly advantageously in production processes that operate in a roll-to-roll process.

In accordance with the invention, single pulse lasers can be used, as well as lasers that generate burst pulses. Basically, the use of lasers in continuous wave operation is also conceivable.

The following specific areas of application arise as examples:

1. Separation of sapphire LEDs with the possibility of cutting the sapphire wafer entirely or partly. With the method in accordance with the invention, the metal layer can likewise be separated, and this in a single step.
2. The dicing of semiconductor wafers is possible without damaging the tape. For this, the focal line is laid only partially in the interior of the substrate material, so that it begins on the surface and stops before the taped film (on the back-side surface of the substrate turned away from the laser): for example, about 10% of the material is not separated. The film thus remains intact, since the focal line "stops" before the film. The semiconductor wafer can then be separated over the remaining 10% via mechanical forces (or thermal forces, see the example below with the $CO_2$ laser).

3. Cutting of coated materials: examples here are Bragg reflectors (DBR) or even metal-coated sapphire wafers. Even processed silicon wafers on which the active metal or metal oxide layers have already been deposited can be cut in accordance with the invention. Other examples are the machining of ITO or AlZnO, with which substrates are coated, which are required, for example, for the production of touchscreens or smart windows. Because of the very extended (compared to its diameter) focal line, a part of the focal line will remove the metal layer (or another layer), while the rest of the focal line penetrates into the transparent material and cuts it. This in particular also has the advantage that correspondingly coated substrates can be separated in a one-step process, thus in a process in which coating and substrate are separated in one operation.

4. Particularly advantageous in accordance with the invention is the cutting of very thin materials (for example, substrates of glass with thicknesses less than 300 µm, less than 100 µm, or even less than 50 µm). These materials can be machined with conventional mechanical methods only at very high cost. Certainly in the case of mechanical methods, edges, damages [sic, "edge damage"], cracks, spalling, which can make the substrates either unusable or make costly secondary machining operations necessary, do arise. On the other hand, cutting in accordance with this invention, in particular with thin materials, offers the advantages of avoiding edge damage and cracks, so that secondary machining is not necessary, [and offers] very high cutting speeds (>1 m/s), very high yield, and conduct of the process in a single step.

5. The method in accordance with the invention can also be used in particular in the production of thin film glasses, which are produced with a continuously running glass drawing process, in order to trim the film edges.

The invention will now be described below by means of some embodiment examples based on the above description. Here:

Figure 3A:
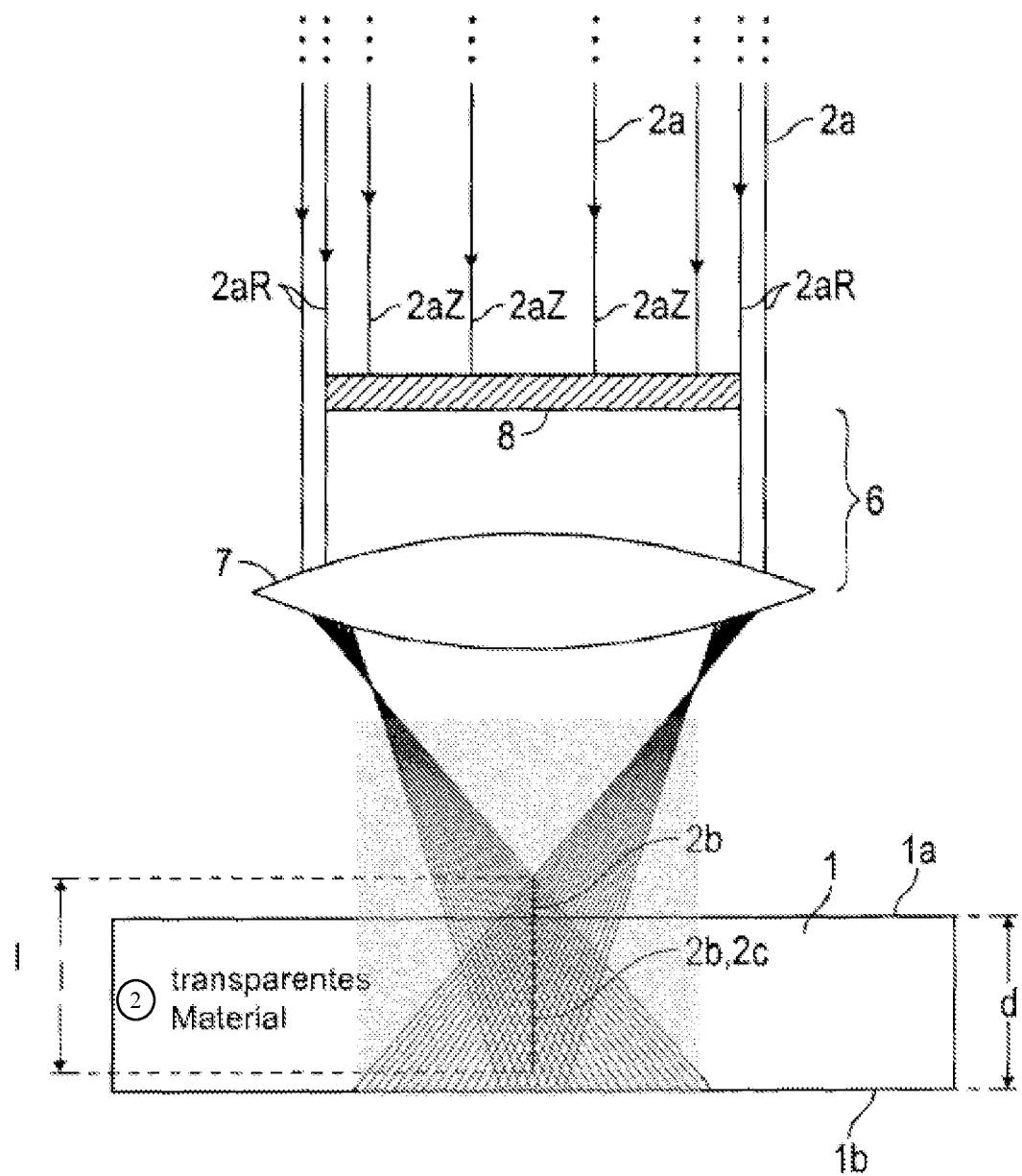
FIG. 3a shows a first optical arrangement that can be used in accordance with the invention.
Figure 4:
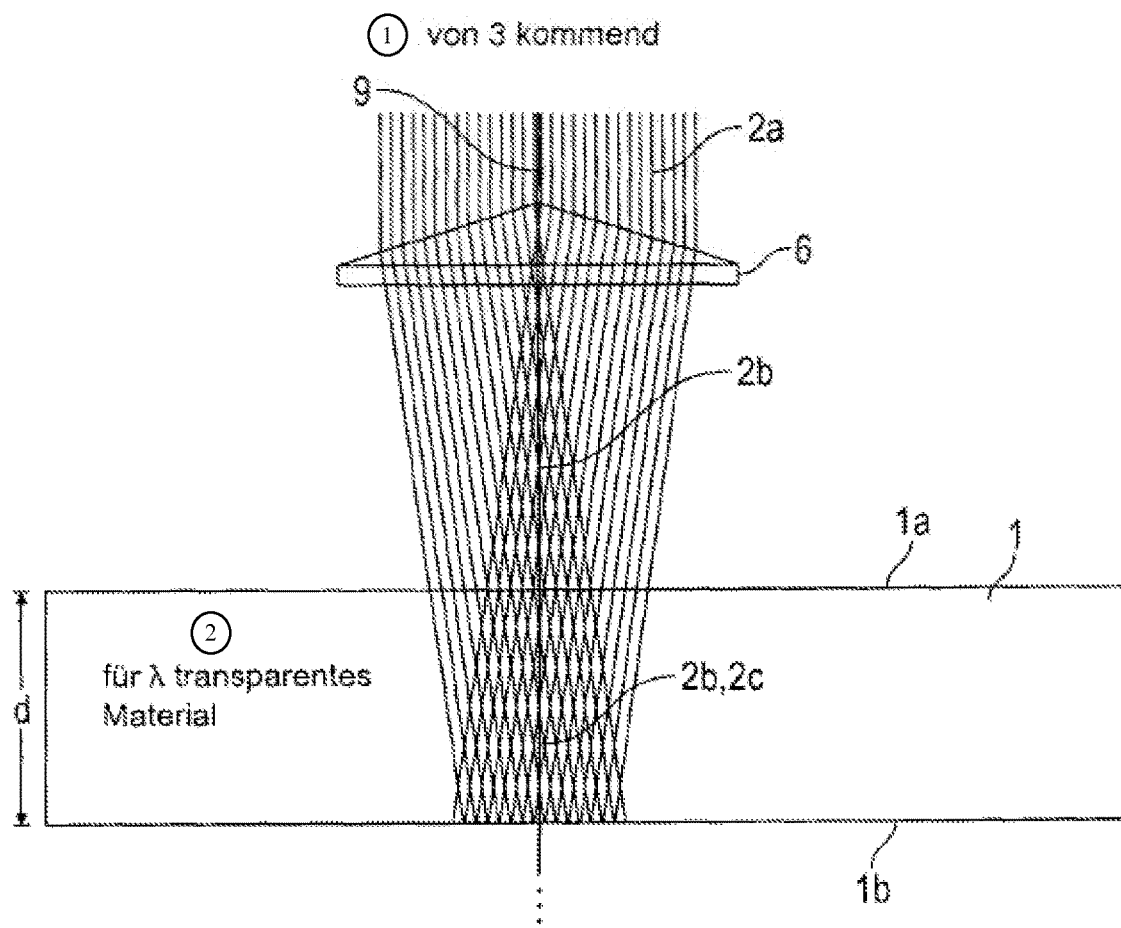
FIG. 4 shows a second optical arrangement that can be used in accordance with the invention.
Figure 5A:
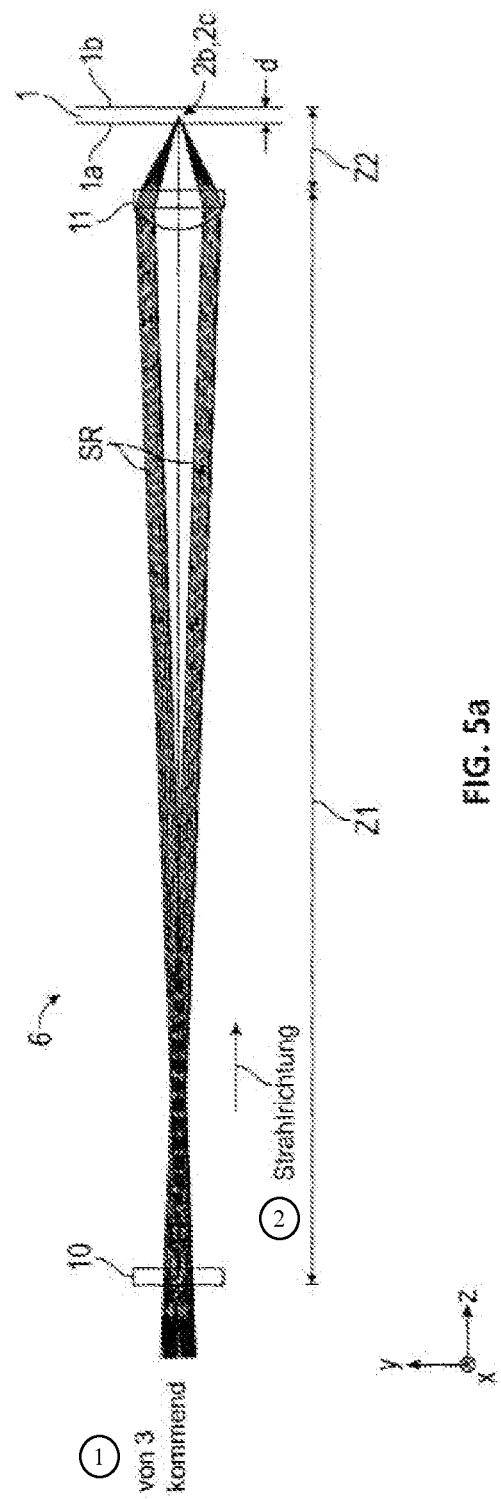
FIGS. 5a and 5b show a third optical arrangement that can be used in accordance with the invention.
Figure 5B:
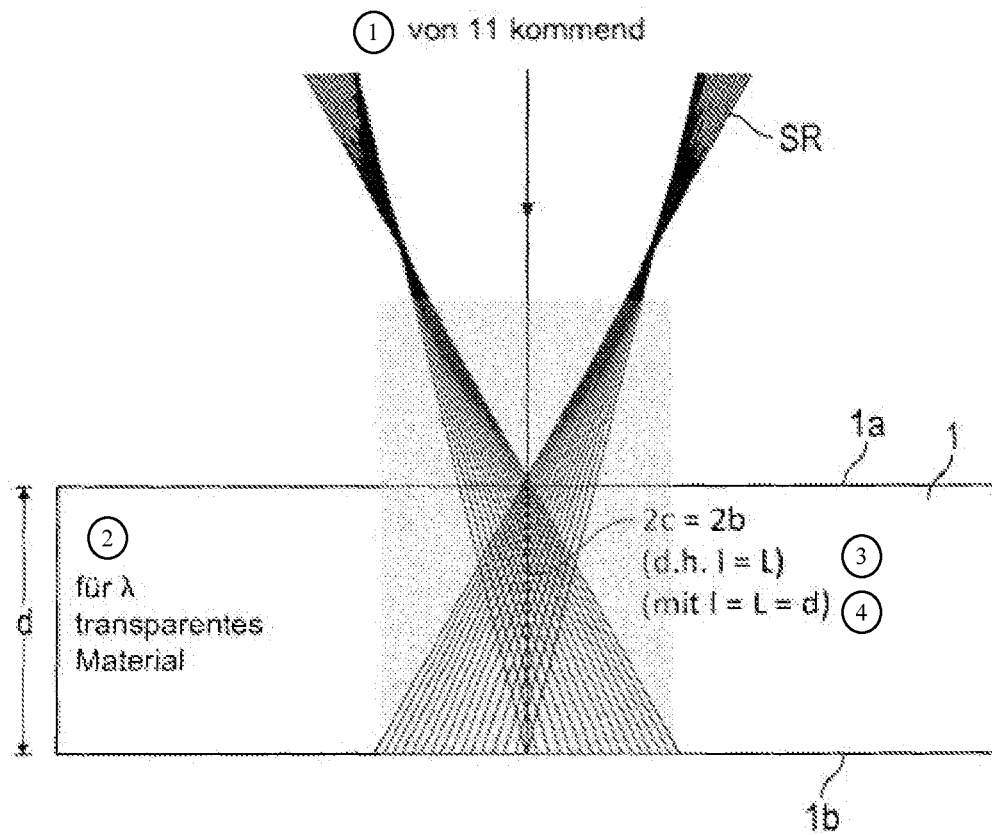
Figure 6:
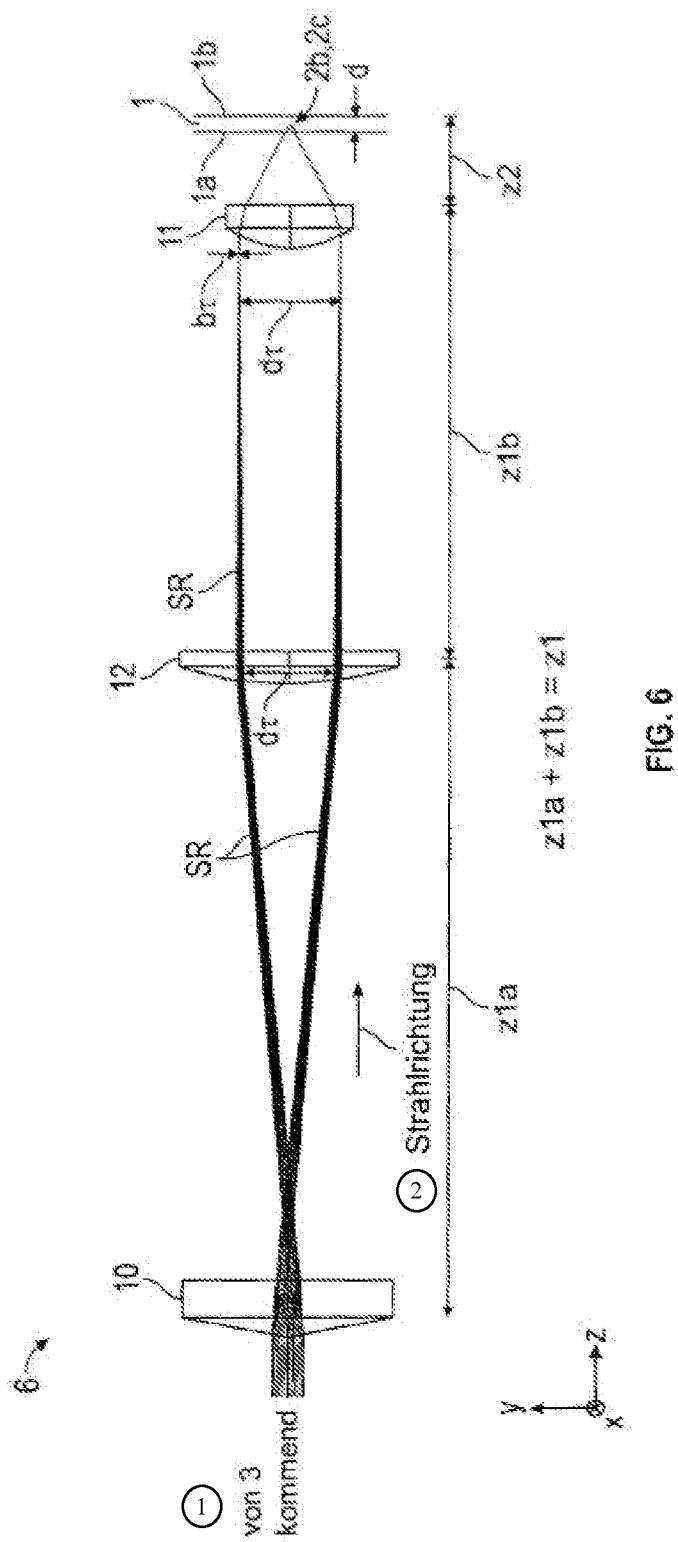
FIG. 6 shows a fourth optical arrangement that can be used in accordance with the invention.
Figure 7:
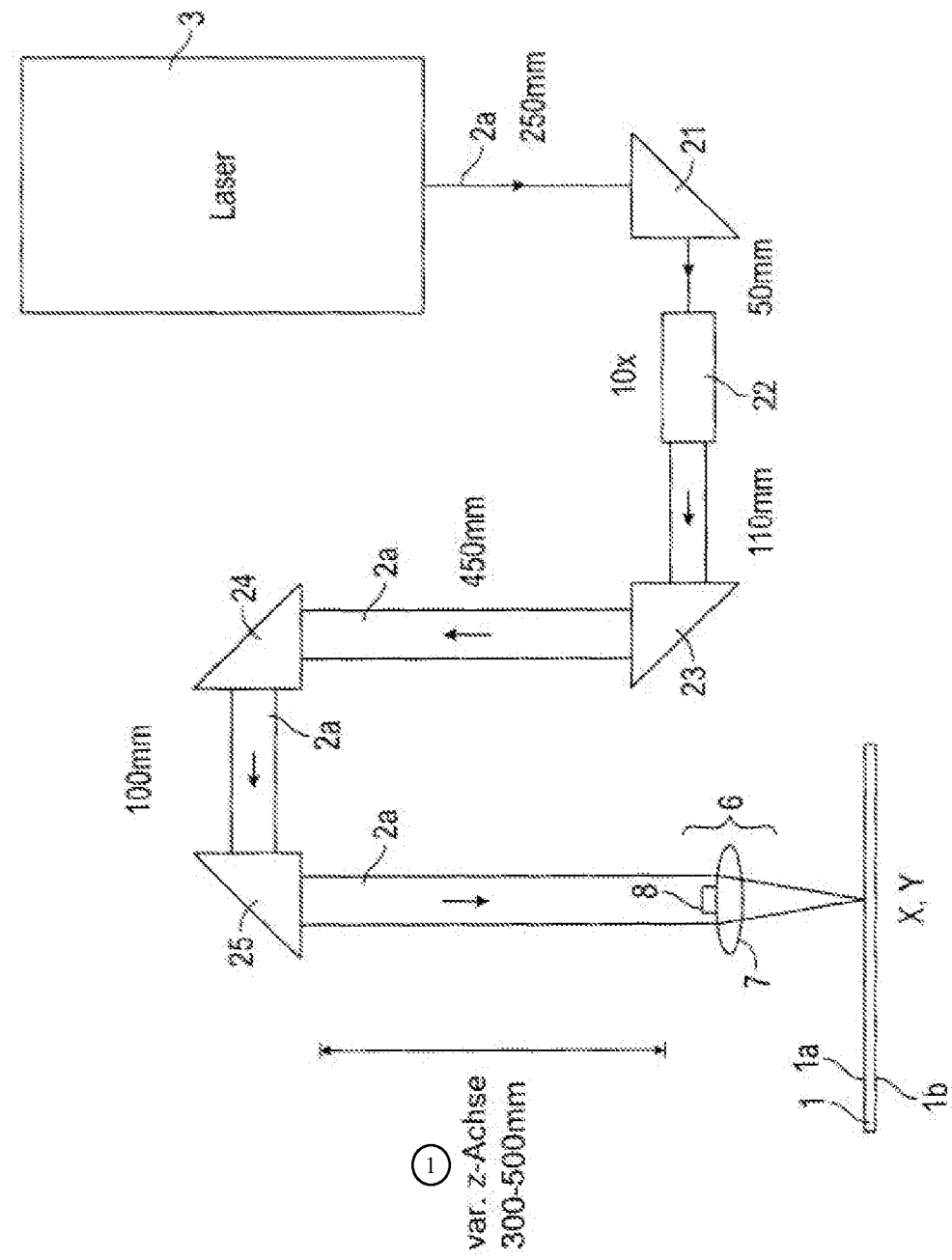

FIG. 7 shows a setup in accordance with the invention for conducting the method using the example of the first usable optical arrangement from FIG. 3a (instead of this optical arrangement, it is also possible to use the other shown optical arrangements of FIGS. 4, 5, and 6 within the framework of the indicated arrangement, by replacing the optical arrangement 6 shown in FIG. 7 by one of the said arrangements).

Figure 8:
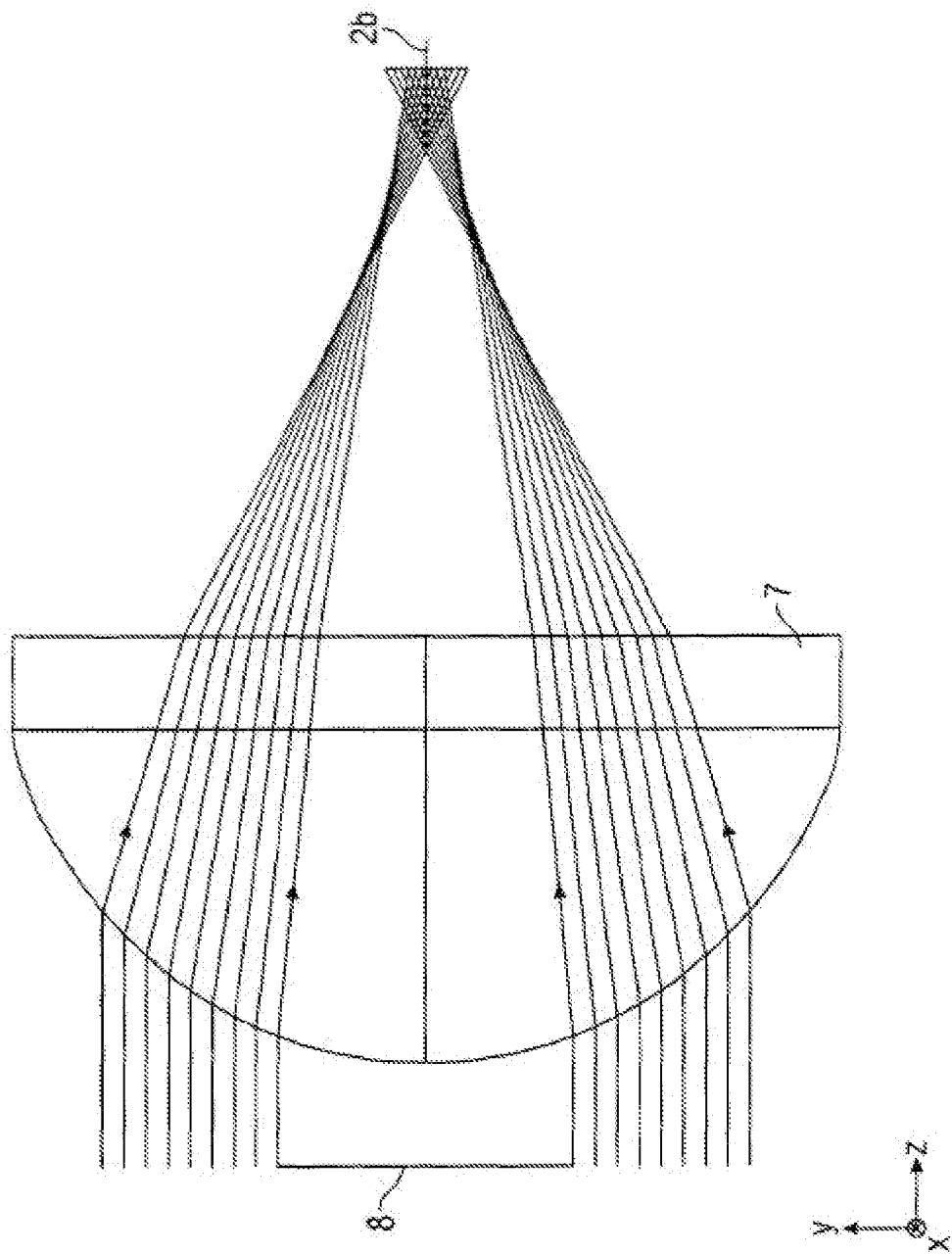

FIG. 8 shows the generation of a focal line in accordance with the invention in detail.

Figure 9:
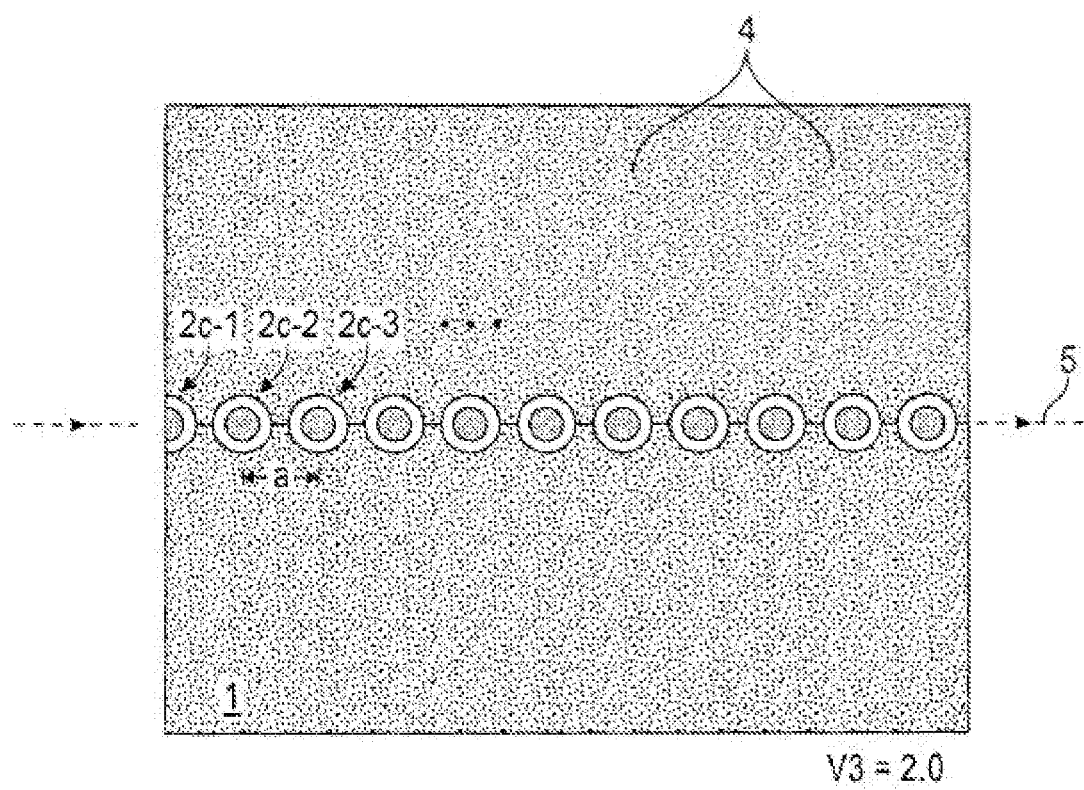

FIG. 9 shows a microscope image of the surface (view onto the substrate plane) of a glass pane machined in accordance with the invention.

Figure 1:
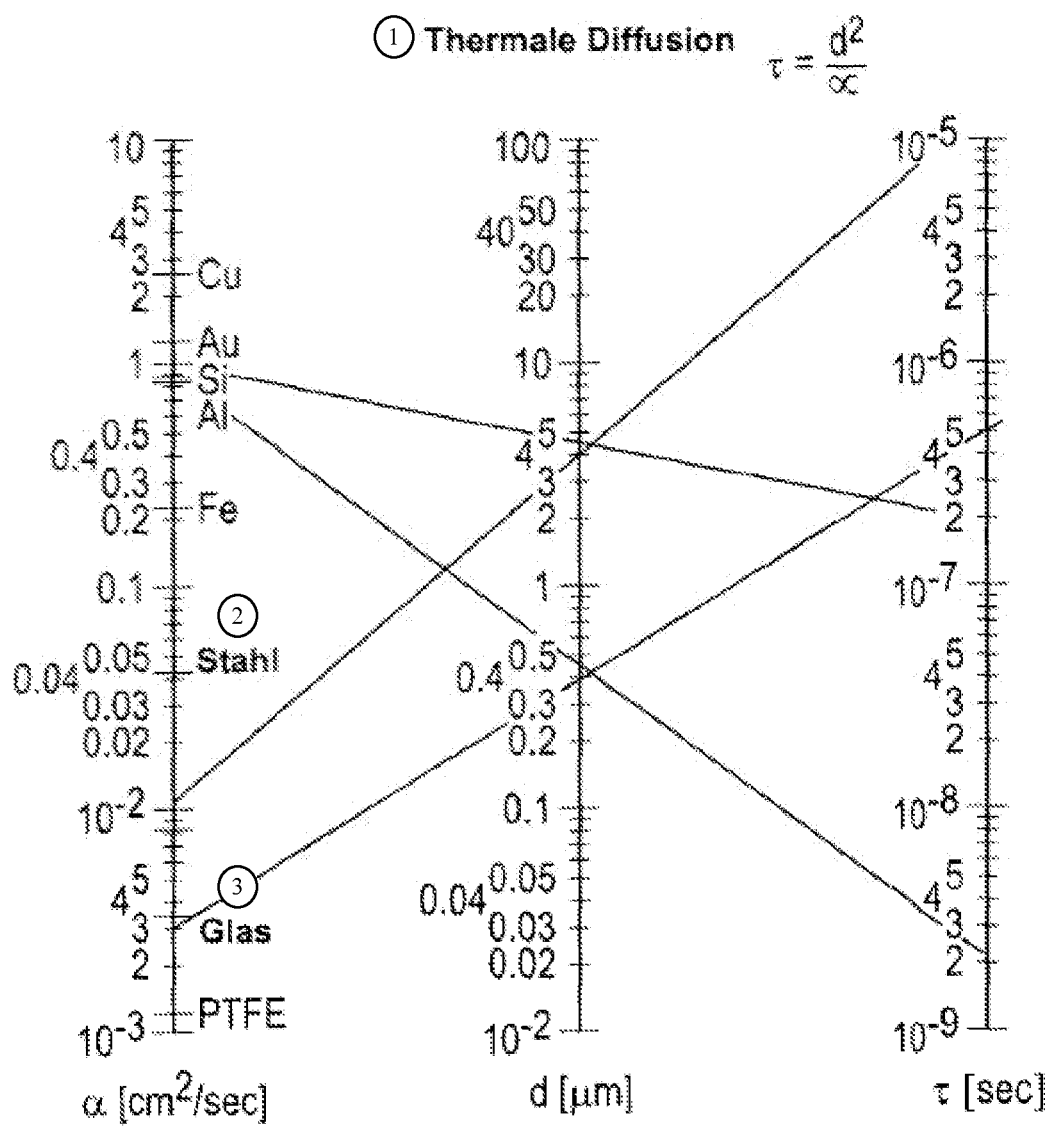
FIG. 1 shows the relation between the thermal diffusion coefficient α, the linear extent in the material (scale length, here indicated as d), and a time τ, for example the laser pulse duration, for different materials.
Figure 2:
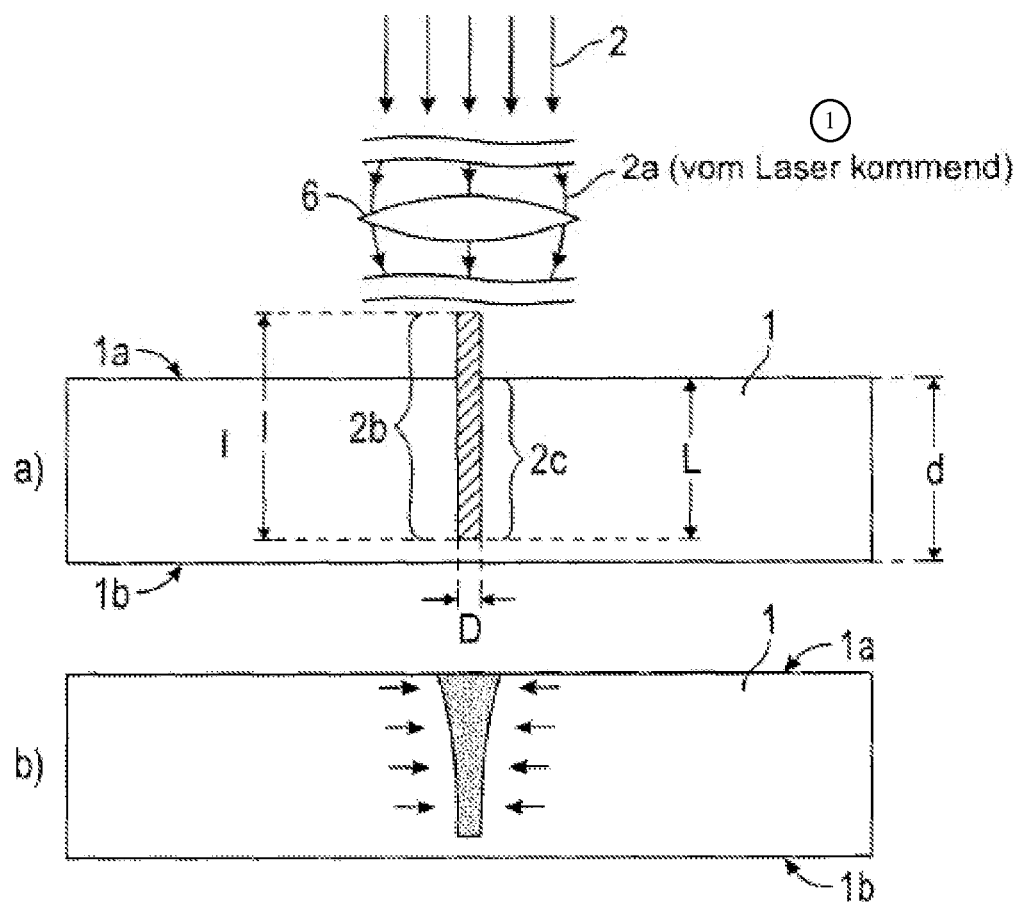
FIG. 2 shows the principle of the positioning of a focal line in accordance with the invention, thus the machining of a material that is transparent for the laser wavelength on the basis of the induced absorption along the focal line.

FIG. 2 outlines the machining method in accordance with the invention. A laser beam 2 emitted by a laser 3 (not shown here, see FIG. 7), where the laser beam on the beam input side of the optical arrangement 6 is indicated by the reference number 2a, is beamed onto the optical arrangement 6 of the invention (see the following embodiment examples in this regard). The optical arrangement 6 forms an extended laser beam focal line 2b over a specific extended range along the beam direction (length l of the focal line) from the radiated laser beam on the beam output side. At least section-wise the laser beam focal line 2b of the laser beam 2 is positioned overlying the substrate to be machined, here flat substrate 1, in the beam path after the optical arrangement. Reference number 1a designates the surface of the flat substrate turned toward the optical arrangement 6 or the laser, while reference number 1b indicates the usually parallel back-side surface 1b of substrate 1, which is at a distance from surface 1a. The substrate thickness (perpendicular to surfaces 1a and 1b, thus measured with respect to the substrate plane) is designated here as d.

As FIG. 2a shows, the substrate 1 here is perpendicular to the lengthwise beam axis and thus to the focal line 2b generated in space by the optical arrangement 6 beyond it (the substrate stands perpendicular to the plane of the drawing) and is positioned as viewed along the beam direction relative to the focal line 2b so that the focal line 2b as viewed in the beam direction begins before the surface 1a of the substrate and ends before the surface 1b of the substrate, thus still in the interior of the substrate. The extended laser beam focal line 2b thus generates (with suitable laser intensity along the laser beam focal line 2b, which is ensured by the focusing of the laser beam 2 on a segment of length l, thus by a linear focus of length l) in the region of overlap of the laser beam focal line 2b with the substrate 1, thus in the substrate material that is passed by the focal line 2b, a segment 2c that is extended, as viewed along the laser beam direction, along which an induced absorption is generated in the substrate material, which induces crack formation in the substrate material along the segment 2c. The crack formation takes place not only locally, but rather over the entire length of the extended segment 2c of the induced absorption. The length of the said segment 2c (thus, ultimately the length of overlapping of the laser beam focal line 2b with the substrate 1) is here indicated by L. The average diameter or the average extent of the segment of the induced absorption (or the region in the substrate material 1 that becomes subject to crack formation) is indicated here by D. This average extent D corresponds here essentially to the average diameter δ of the laser beam focal line 2b.

As FIG. 2a shows, substrate material that is transparent for the wavelength λ of laser beam 2 is thus heated in accordance with the invention by induced absorption along the focal line 2b. FIG. 2b shows that the heated material ultimately expands, so that a correspondingly induced stress leads to microcrack formation in accordance with the invention, and the stress is the greatest at surface 1a.

Specific optical arrangements 6 that can be used to generate the focal line 2b and a specific optical setup (FIG. 7) in which these optical arrangements can be used are described below. All arrangements or setups are based on the above description, so that in each case the same reference numbers are used for identical components or features or ones that correspond in function. Therefore, in each case only differences are described below.

Since the separation surface that ultimately leads to separation is or should be, in accordance with the invention, high in quality (with regard to fracture strength, geometric precision, roughness, and the avoidance of secondary machining requirements), the individual focal lines to be positioned along the separation line 5 on the surface of the substrate should be generated as described by means of the following optical arrangement (the optical arrangement is alternatively also called the laser optics below). The roughness in this case results in particular from the spot size, or the spot diameter, of the focal line. In order to be able to achieve a small spot size of, for example, 0.5 µm to 2 µm for a given wavelength λ of laser 3 (interaction with the material of substrate 1), as a rule certain requirements need to be imposed on the numerical aperture of the laser optics 6. These requirements are satisfied by the laser optics 6 described below.

To achieve the desired numerical aperture, the optics for one thing must have the required aperture for the given focal length, in accordance with the known formulas of Abbé (N.A.=n sin (theta); n=refractive index of the glass being machined; theta=half the aperture angle; and theta=arctan (D/2f); D=aperture; f=focal length). For another thing, the laser beam must illuminate the optics up to the necessary aperture, which is typically brought about by beam expansion by means of an expansion telescope between the laser and the focusing optics.

For uniform interaction, the spot size should not vary too greatly along the focal line. This can be ensured, for example (see embodiment example below), by lighting the focusing optics only in a narrow, ring-shaped region, while then naturally changing the beam aperture and thus the numerical aperture percentagewise only a little bit.

According to FIG. 3a (section perpendicular to substrate plane at level of the central beam in the laser beam bundle of the laser beam 2; here, too, the lighting of the laser beam 2 takes place perpendicular to the substrate plane, i.e., angle β is 0°, so that the focal line 2b or the extended segment of the induced absorption 2c is parallel to the substrate normal), the laser beam 2a emitted by laser 3 is initially directed to a circular diaphragm 8, which is completely nontransparent for the laser beam that is used. The diaphragm 8 is oriented perpendicular to the beam lengthwise axis and is centered on the central beam of the indicated beam bundle 2a. The diameter of the diaphragm 8 is chosen so that the beam bundle (here indicated as 2aZ) lying near the center of the beam bundle 2a or the central beam strikes the diaphragm and is completely absorbed by it. Only beams lying in the outer circumferential region of the beam bundle 2a (edge beams, here indicated with 2aR) are not absorbed because of the reduced diaphragm size, which is smaller than the beam diameter, but rather pass the diaphragm 8 laterally and strike the edge regions of the focusing optical element of the optical arrangement 6, which is made here as a spherically ground, biconvex lens 7.

The lens 6 centered on the central beam is intentionally made as an uncorrected, biconvex focusing lens in the form of a conventional spherically ground lens. In other words, the spherical aberration of such a lens is intentionally utilized. Alternatively, it is also possible to use aspherical lenses or multiple lenses that deviate from ideally corrected systems and that do not form an ideal focal point, but rather form a pronounced, lengthwise extended focal line of defined length (therefore, lenses or systems that do not exactly have a single focal point). The zones of the lens thus focus exactly in dependence on the distance from the center of the lens along a focal line 2b. The diameter of the diaphragm 8 across the beam direction here amounts to about 90% of the diameter of the beam bundle (beam bundle diameter defined by the expansion up to a falloff to 1/e) and about 75% of the diameter of the lens of the optical arrangement 6. In accordance with the invention, thus the focal line 2b of a non-aberration-corrected spherical lens 7 that was produced by masking out the beam bundle in the center is used. Shown is the section in a plane through the central beam, which results in the completely three dimensional bundle if one rotates the represented beams about the focal line 2b.

One disadvantage of this focal line is that the conditions (spot size, laser intensity) vary along the focal line and thus along the desired depth in the material, and thus the desired kind of interaction (no melting, induced absorption, thermal/plastic deformation up to crack formation) possibly can only be established within a part of the focal line. Conversely, this means that possibly only a part of the radiated laser light is absorbed in the desired way. Thus, for one thing, the efficiency of the method (average laser power required for desired separation rate) becomes degraded, while for another laser light is possibly transmitted to undesired, more deeply lying sites (to parts or layers bonding the substrate or to the substrate holder) and produces undesirable interactions there (heating, scattering, absorption, undesired modification).

Figure 3B:
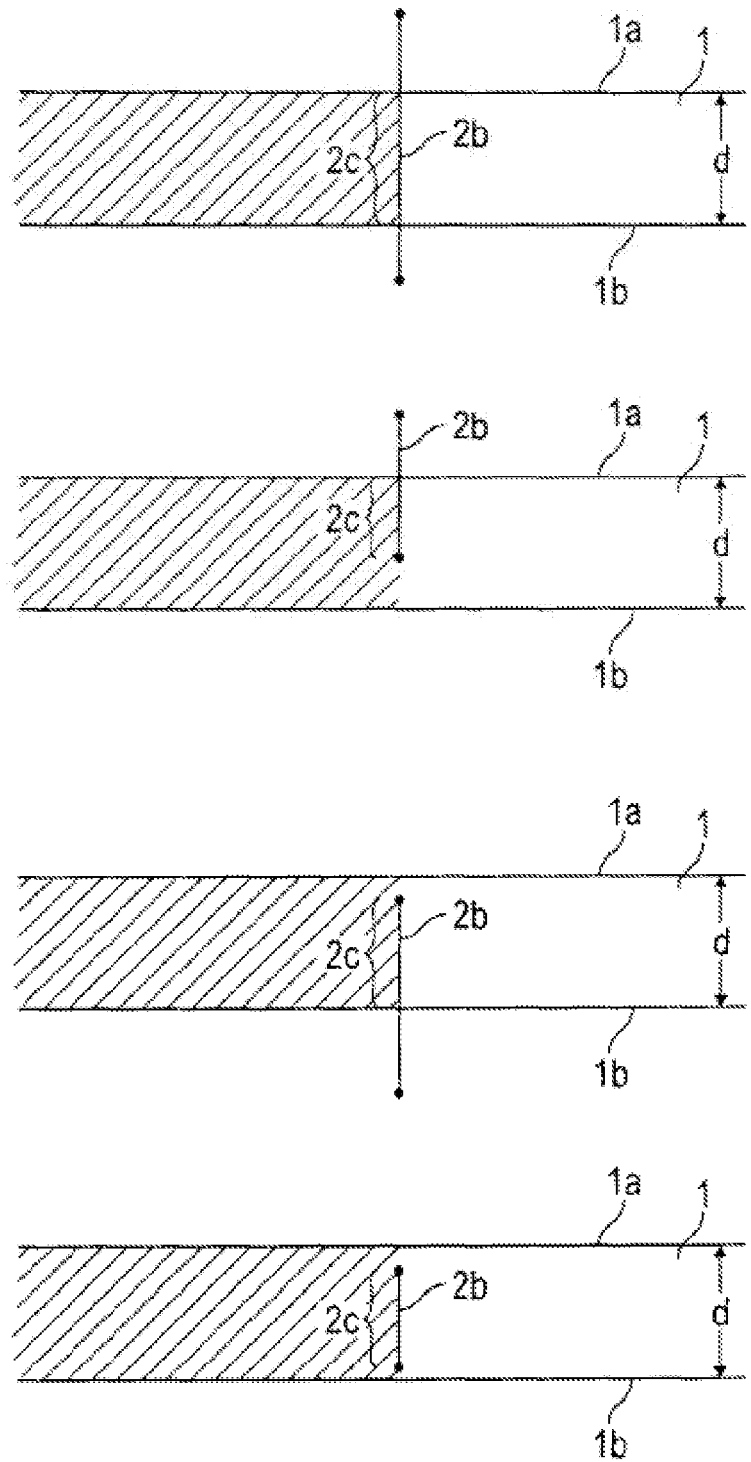
FIG. 3b shows different possibilities of machining of the substrate by different positioning of the laser beam focal line relative to the substrate.

FIG. 3b shows (not just for the optical arrangement in FIG. 3a, but basically for all other usable optical arrangements 6) that the laser beam focal line 2b can be differently positioned by suitable positioning and/or directing of the optical arrangement 6 relative to substrate 1 and by suitable choice of the parameters of the optical arrangement 6: As the first row in FIG. 3b indicates, the length l of the focal line 2b can be set so that it overshoots the substrate thickness d (here by a factor of 2). Thus, if one places the substrate 1, as viewed in the direction of the beam, centrally to the focal line 2b, an extended segment of induced absorption 2c is generated over the entire substrate thickness.

In the case shown in the second part of FIG. 3b, a focal line 2b of length l is generated, which corresponds approximately to the extent of the substrate d. Since the substrate 1 is positioned relative to line 2 so that line 2b begins at a point before it, thus outside the substrate, the length L of the extended segment of induced absorption 2c (which here extends from the surface of the substrate to a defined substrate depth, but not all the way to the back-side surface 1b) is here less than the length l of the focal line 2b. The third row in FIG. 3b shows the case in which the substrate 1 as viewed along the beam direction is partially positioned before the beginning of the focal line 2b, so that here, too, for the length l of line 2b, l>L (L=extent of the segment of induced absorption 2c in substrate 1). The focal line thus begins in the interior of the substrate and extends over the back-side surface 1b to outside of the substrate. The fourth row in FIG. 3b finally shows the case in which the generated focal line length l is less than the substrate thickness d, so that if the substrate is centrally positioned relative to the focal line as viewed in the beam direction, the focal line here begins close to surface 1*a* in the interior of the substrate and ends close to surface 1*b* in the interior of the substrate (l=0.75·d).

In accordance with the invention, it is especially advantageous to implement the focal line positioning so that at least one of the surfaces 1*a*, 1*b* is spanned by the focal line; the segment of the induced absorption 2*c* thus begins at at least one surface. In this way nearly ideal cuts can be achieved through the avoidance of ablation, feathering, and particle formation at the surface.

FIG. 4 shows another optical arrangement 6 that can be used in accordance with the invention. The basic structure follows that described in FIG. 3, so that only the differences are described below. The indicated optical arrangement is based on the idea of using optics with a nonspherical free surface to form the focal line 2*b*, with the surface being formed so that a focal line of defined length l is formed. For this, aspherical lenses can be used as the optical elements of the optical arrangement 6. For example, a so-called conical prism, which is also called an axicon, is used in FIG. 4. An axicon is a special conically ground lens that forms a point source on a line along the optical axis (or also transforms a laser beam into a ring). The structure of such an axicon is basically well known to one skilled in the art; the cone angle here is, for example, 10°. The axicon indicated here by reference number 9 is directed with its vertex opposite the beam direction and centered on the center of the beam. Since the focal line 2*b* of the axicon 9 already begins within the axicon, the substrate 1 (which is here arranged perpendicular to the main beam axis) can be positioned immediately after the axicon 9 in the beam path. As FIG. 4 shows, because of the optical properties of the axicon, a shifting of the substrate 1 along the beam direction is also possible without it leaving the region of the focal line 2*b*. The extended segment of the induced absorption 2*c* in the material of the substrate 1 thus extends over the entire substrate depth d.

To be sure, the shown structure has the following limitations: since the focal line of the axicon 9 already begins within the lens, with the finite working distance between the lens and material, a certain portion of the laser energy is not focused in the part 2*c* of focal line 2*b*, which lies in the material. In addition, with the available refractive indices and cone angles of axicon 9, the length l of the focal line 2*b* links with the beam diameter, so that in the case of relatively thin material (a few millimeters), the focal line is all in all too long, due to which in turn the laser energy cannot be focused purposefully into the material.

For this reason, there is an improved optical arrangement 6 that can be used in accordance with the invention when it comprises both an axicon and a focusing lens.

FIG. 5*a* shows such an optical arrangement 6, in which first a first optical element with a nonspherical free surface, which is formed for formation of an extended laser beam focal line 2*b*, is positioned in the beam path of laser 3 as viewed along the beam direction. In the indicated case, this first optical element is an axicon 10 with 5° cone angle, which is positioned perpendicular to the beam direction and centered on the laser beam 3. The vertex of the axicon points in the direction opposite the beam direction. In the beam direction at a distance z1 from axicon 10 there is a second, focusing optical element, here a planoconvex lens 11 (whose curvature points toward the axicon). The distance z1 is chosen to be about 300 mm here, so that the laser beam formed by axicon 10 strikes the outer regions of lens 11 in a ring shape. The lens 11 focuses the ring-shaped beam on the beam output side in the distance z2, here about 20 mm from lens 11, onto a focal line 2*b* of defined length, here 1.5 mm. The effective focal length of the lens 11 is 25 mm here. The ring shape transformation of the laser beam by axicon 10 is indicated here with the reference number SR.

FIG. 5*b* shows the development of the focal line 2*b* or the induced absorption 2*c* in the material of the substrate 1 according to FIG. 5, in detail. The optical properties of the two elements 10 and 11 and the positioning thereof takes place here so that the extent l of the focal line 2*b* in the beam direction exactly corresponds with the thickness d of substrate 1. Accordingly, a precise positioning of the substrate 1 along the beam direction is necessary, as shown in FIG. 5*b*, in order to position the focal line 2*b* exactly between the two surfaces 1*a* and 1*b* of the substrate 1.

In accordance with the invention, it is thus advantageous if the focal line arises at a certain distance from the laser optics, and the greater portion of the laser beam is focused up to a desired end of the focal line. This can be achieved as described in that a primarily focusing element 11 (lens) is lighted only in a ring shape on a desired zone, through which for one thing the desired numerical aperture and thus the desired spot size is implemented and for another, however, after the desired focal line 2*b*, the scattered circle loses intensity over a very short distance in the center of the spot, since an essentially ring-shaped spot is formed. Thus, the crack formation in the meaning of the invention is stopped within a short distance at the desired depth of the substrate. A combination of axicon 10 and focal lens 11 satisfies this requirement. Here the axicon 10 acts in a dual manner: through the axicon 10, a generally round laser spot is sent in a ring shape to the focusing lens 11 and the asphericity of the axicon 10 causes a focal line to form outside the focal plane instead of a focal point in the focal plane of the lens. The length l of the focal line 2*b* can be adjusted via the beam diameter on the axicon. The numerical aperture along the focal line in turn can be adjusted via the distance z1 of the axicon lens and via the cone angle of the axicon. In this way the entire laser energy can be concentrated in the focal line.

If the crack formation in the meaning of the invention is to be stopped before the exit side of the substrate, the ring-shaped lighting still has the advantage that for one thing the laser power is used as well as possible, since a large part of the laser light remains concentrated in the desired length of the focal line, and for another, due to the ring-shaped lighted zone together with the desired aberration established by the other optical functions, a uniform spot size can be achieved along the focal line and thus a uniform separation process in accordance with the invention can be achieved along the focal line.

Instead of the planoconvex lens shown in FIG. 5*a*, it is also possible to use a focusing meniscus lens or another more highly corrected focusing lens (aspherical lens, multiple lenses).

To generate very small focal lines 2*b* with the combination of an axicon and a lens shown in FIG. 5*a*, one must choose very small beam diameters of the laser beam that strikes the axicon. This has the practical disadvantage that the centering of the beam on the peak of the axicon must be very precise, and therefore the result becomes very sensitive to variations of the direction of the laser (beam drift stability). In addition, a narrowly collimated laser beam is very divergent, i.e., the beam bundle dissolves over short path distances because of light refraction.

Both can be avoided by inserting an additional lens, a collimation lens 12 (FIG. 6): through this additional positive lens 12, the ring-shaped lighting of the focusing lens 11 can be set to be very narrow. The focal length f of the collimation lens 12 is chosen so that the desired ring diameter $d_r$ results at a spacing z1a from the axicon to the collimation lens 12 that is equal to f. The desired width $b_r$ of the ring can be chosen via the spacing z1b (collimation lens 12 to focusing lens 11). Now a short focal line follows on a purely geometric basis from the small width of the ring-shaped lighting. A minimum is achieved in turn in the spacing f.

The optical arrangement 6 shown in FIG. 6 is thus based on the one shown in FIG. 5a, so that only the differences are described below. The collimation lens 12, which here is likewise made as a planoconvex lens (with its curvature pointing opposite the direction of the beam), is additionally introduced here centrally in the beam path between axicon 10 (which here is disposed with its vertex opposite the beam direction) on the one hand and the planoconvex lens 11 on the other. The spacing of the collimation lens 12 from axicon 10 is indicated here by z1a, the spacing of the focusing lens 11 from the collimation lens 12 is indicated by z1b, and the spacing of the generated focal line 2b from the focusing lens 11 is indicated by z2 (in each case as viewed in the beam direction. As FIG. 6 shows, the ring-shaped beam SR formed by axicon 10 and striking the collimation lens 12 while diverging and while under the ring diameter $d_r$ is set to the desired ring width $b_r$ at the point of focusing lens 11 along the stretch z1b while keeping ring diameter $d_r$ at least approximately constant. In the indicated case, a very short focal line 2b should be generated, so that the ring width $b_r$ of about 4 mm at the point of lens 12 is reduced by the focusing properties of the latter at the point of lens 11 to about 0.5 mm (ring diameter $d_r$ here is, for example, 22 mm).

In the example shown, a focal line length l of under 0.5 mm can be achieved with a typical beam diameter from the laser of 2 mm, with a focusing lens 11 of f=25 mm focal length and a collimation lens of f=150 mm focal length. In addition, Z1a=Z1b=140 mm and Z2=15 mm.

An example of the separation in accordance with the invention of unhardened glass with an optical arrangement as in FIG. 3a in a construction in accordance with the invention as in FIG. 7 is given below (instead of the optical arrangement 6 shown in FIG. 3a, it is also possible to use the other optical arrangements 6 described above in the construction according to FIG. 7 by correspondingly replacing the diaphragm/lens combination 8, 7 shown there).

Borosilicate or soda lime glasses 1 without special colorings (especially with low iron content) are optically transparent from about 350 nm to about 2.5 μm. In general, glasses are poor heat conductors, due to which laser pulse durations of a few nanoseconds do not allow any significant heat diffusion outward from a focal line 2b. Nevertheless, shorter laser pulse durations are still advantageous, since a desired induced absorption via nonlinear effects is more easily achieved with subnanosecond or picosecond pulses (intensity considerably higher).

A commercial picosecond laser 3 that has the following parameters, for example, is suitable for separation of flat glasses in accordance with the invention: wavelength 1064 nm, pulse duration 10 ps, pulse repetition rate 100 kHz, average power (measured directly after the laser) up to 50 W. The laser beam initially has a beam diameter (measured at 13% peak intensity, i.e., $1/e^2$-diameter of a Gaussian beam bundle) of about 2 mm; the beam quality is at least $M^2<1.2$ (determined per DIN/ISO 11146). The beam diameter is increased by a factor of 10 to about 20-22 mm with a beam expansion optics 22 (commercial Kepler beam telescope) (21, 23, 24, and 25 are beam-deflecting mirrors). With a so-called annular diaphragm 8 having a 9-mm diameter, the inner part of the beam bundle is masked off, so that a ring-shaped beam is formed. A planoconvex lens 7 with 28-mm focal length (quartz glass with radius 13 mm), for example, is lighted with this ring-shaped beam. The focal line in accordance with the invention arises through the strong (desired) spherical aberration of lens 7. In addition to FIG. 7 in this regard, see also FIG. 8, which outlines the generation of the focal line 2b from edge beams through lens 7.

The theoretical diameter δ of the focal line varies along the beam axis; therefore it is advantageous for the generation of a homogeneous crack surface if the substrate thickness d here is less than about 1 mm (typical thicknesses for display glasses are 0.5 mm to 0.7 mm). With a spot size of about 2 μm and a spot to spot spacing of 5 μm, there results a speed of 0.5 m/sec, with which the focal line can be guided 5 over the substrate 1 (see FIG. 9). With 25 W average power on the substrate (measured after the focusing lens 7), a pulse energy of 250 μJ results from the pulse repetition rate of 100 kHz; this pulse energy can also take place in a structured pulse (rapid sequence of single pulses spaced only 20 ns apart, a so-called burst pulse) of 2 to 5 subpulses.

Unhardened glasses essentially do not have internal stresses, due to which here the distortion zone, which is still interlocked and linked together by unseparated bridges, initially still holds the pieces together without an external action. However, if thermal stress is introduced, the substrate separates completely and without the additional external introduction of force along the lased fracture surface 5. For this, a $CO_2$ laser with up to 250 W average power is focused on a spot site of about 1 mm, and this spot is guided over the separation line 5 at up to 0.5 m/s. The local thermal stress caused by the introduced laser energy (5 J per cm of separation line 5) separates the workpiece 1 completely.

For the separation of thicker glasses, the threshold intensity for the process (induced absorption and formation of a distortion zone through thermal shock) naturally must be achieved over a longer focal line l. Higher required pulse energies and higher average powers thus follow. The separation of about 3-mm thick glass can be managed with the above described optical structure and the maximally available laser power (after losses due to the optics) of 39 W on the substrate. Here the annular diaphragm 8 is removed for one thing, and for another the distance of lens 7 to the substrate is corrected (increased in the direction of the nominal focal distance) so that a longer focal line arises in the substrate.

Another embodiment example for separation of hardened glass (likewise with the device shown in FIGS. 3a and 7) is presented below.

Sodium-containing glasses are hardened by exchanging sodium for potassium at the glass surface through immersion in molten potassium salt baths. This leads to a considerable internal stress (compressive stress) in a 5-50-μm thick layer at the surface, which in turn leads to higher stability.

Basically the process parameters in the separation of hardened glasses are similar to those in the case of unhardened glasses of similar dimension and composition. However, the hardened glass can shatter very much more easily due to the internal stress, specifically due to undesired crack growth that does not take place along the lased intended fracture surface 5, but rather goes into the material. For this reason, the parameter field for successful separation of a specific hardened glass is more narrowly defined. In particular, the average laser power and the pertinent cutting rate must be maintained quite precisely, specifically in dependence on the thickness of the hardened layer. For a glass with a hardened layer 40-μm thick and a total thickness of 0.7 mm and the above setup, the following parameters, for example, result: cutting speed 1 m/s at 100 kHz pulse repetition rate, therefore a spot spacing of 10 μm, at an average power of 14 W.

The internal stress of the hardened glass leads to the fractured zone 5 forming completely after some time (a few seconds), and the substrate is separated into the desired pieces.

Very thin hardened glasses (<100 μm) consist largely of stressed material, i.e., the front and back side are, for example, sodium-depleted and thus each hardened over 30 μm, with only 40 μm in the interior remaining unhardened. Such material shatters very easily and completely if one of the surfaces is damaged. Such hardened glass films were not machinable up to now in the prior art.

The separation of such material in accordance with the method of the invention is possible if a) the diameter of the focal line is very small, for example less than 1 μm, b) the spot to spot spacing is low, for example between 1 and 2 μm, and c) the separation speed is high enough that the crack growth cannot run ahead of the laser process (high laser pulse repetition rate, for example 200 kHz at 0.2 to 0.5 m/s).

Another embodiment example (likewise with the device described in FIGS. 3*a* and 7) for separation of sapphire glass and crystalline sapphire is presented below.

Sapphire crystals and sapphire glasses are indeed optically similar glasses (transparency and refractive index), but their mechanical and thermal behaviors are considerably different. Thus, sapphire is an excellent heat conductor, is mechanically extremely durable, and is very hard and scratch resistant. Nevertheless, thin (0.3 mm to 0.6 mm) sapphire crystals and glasses can be separated by means of the above described laser and optical setup. Because of the high mechanical stability, it is especially important that the remaining bridges between the pieces to be separated are minimized, since otherwise very high forces are needed for the ultimate separation. The distortion zone must be formed as completely as possible from the substrate entry surface 1*a* to exit surface 1*b*. As with thicker glasses, this can be achieved with higher pulse energy and thus higher average laser power. In addition, crystalline sapphire is birefringent. The cutting surface must be perpendicular to the optical axis (so-called C cut). The following parameters can be used for separation of a crystalline sapphire 0.45 mm thick: an average laser power of 30 W at 100 kHz pulse repetition rate, a spot size of 2 μm, and a spot spacing of 5 μm, which corresponds to a cutting speed of 0.5 m/s at the indicated pulse repetition rate. As in the case of glass, it may be necessary for complete separation to carry out a subsequent heating of the cutting line 5, for example with a $CO_2$ laser spot, so that via the thermal stress, the distortion zone develops via crack growth into a complete, continuous, uninterlocked separation surface.

Finally, FIG. 9 shows a microscope image of the surface of a glass pane machined in accordance with the invention. The individual focal lines or extended segments of induced absorption 2*c*, which are here given the reference numbers 2*c*-1, 2*c*-2, etc. (in the depth of the substrate perpendicular to the indicated surface), connect along line 5, along which the laser beam was guided over the surface 4 of the substrate, due to crack formation to form a separation surface for separation of the substrate pieces. One can readily see the plurality of individual expanded segments of induced absorption, where in the indicated case the pulse repetition rate of the laser was matched to the feed rate for movement of the laser beam over the surface 4 so that the ratio $V3=a/\delta$ consisting of the average spacing a of immediately adjacent segments 2*c*-1, 2 [sic], 2*c*-2, . . . and the average diameter $\delta$ of the laser beam focal line is about 0.2.

The invention claimed is:

1. A system comprising:
   a substrate; and
   a device for laser-based machining that is configured to separate the substrate into a plurality of pieces, the device comprising:
      a laser providing a laser beam for machining the substrate when directed at the substrate, the wavelength $\lambda$ of the laser beam being such that a material of the substrate is transparent to the wavelength $\lambda$; and
      an optical arrangement positioned in a beam path of the laser, wherein:
         the optical arrangement comprises a first optical element and a second optical element;
         the second optical element is disposed on the beam output side of the first optical element, at a distance z1 from the first optical element; and
         the first optical element and the second optical element are positioned and directed such that the laser beam strikes the second optical element in a ring shape, and a laser beam focal line extending along the direction of the laser beam is generated on the beam output side of the second optical element at a spacing z2 from the second optical element; wherein:
      the substrate is positioned relative to the laser beam focal line so that in the material of the substrate, an induced absorption takes place along a segment of the laser beam focal line that is extended as viewed in the direction of the beam along a single continuous cracking zone, wherein an induced crack formation is produced in the material of the substrate along the said extended segment.

2. The system of claim 1, wherein the second optical element comprises a focusing optical element with spherical aberration.

3. The system of claim 1, wherein the first optical element comprises a nonspherical free surface, which is shaped to form the laser beam focal line with a defined length l.

4. The system of claim 1, wherein the device for laser based machining further comprises a third optical element positioned in the beam path of the laser between the first and the second optical element.

5. The system of claim 1, wherein the first optical element comprises a conical prism or axicon.

6. The system of claim 1, wherein:
   the first optical element comprises a diaphragm and the second optical element comprises a focusing element; and
   the diaphragm is positioned to block beam bundles in a center of the laser beam incident on the diaphragm without blocking edge beams of the laser beam.

7. The system of claim 6, wherein the diaphragm is an annular diaphragm.

8. The system of claim 2, wherein the first optical element comprises a diaphragm disposed in the beam path of the laser beam in front of the second optical element, wherein the diaphragm is positioned to block beam bundles in a center of the laser beam incident on the diaphragm without blocking edge beams of the laser beam.

9. The system of claim 8, wherein the diaphragm is an annular diaphragm.

10. The system of claim 2, wherein the second optical element comprising the focusing optical element with spherical aberration comprises at least one convex surface.

11. The system of claim 1 wherein the second optical element comprises a lens with a convex surface.

12. The system of claim 4, wherein the third optical element comprises a collimation lens.

13. The system of claim 12, wherein the third optical element comprises a convex surface.

14. The system of claim 1, wherein the substrate comprises two opposite substrate surfaces and is positioned in relation to the laser beam focal line such that the extended segment of the induced absorption in the material of the substrate extends up to at least one of the two opposite substrate surfaces, and
the average laser power, measured directly on the output side of the laser beam, is between 10 watts and 100 watts.

15. The system of claim 14, wherein the substrate is positioned within the device in relation to the laser beam focal line such that the extended segment of the induced absorption in the material of the substrate extends starting from one of the two opposite substrate surfaces into the substrate, but not up to the other of the two opposite substrate surfaces.

16. The system of claim 15, the substrate is positioned in relation to the laser beam focal line such that the extended segment of the induced absorption in the material of the substrate extends starting from one of the two opposite substrate surfaces into the substrate over 80% of the thickness of the substrate, but not up to the other of the two opposite substrate surfaces.

17. The system of claim 1, wherein the length l of the laser beam focal line in the longitudinal direction of the beam is between 0.1 mm and 100 mm.

18. The system of claim 17, wherein length l of the laser beam focal line is between 0.3 mm and 10 mm.

19. The system of claim 1, wherein the laser is adapted to produce the laser beam that is a burst pulse laser beam, with each burst pulse comprising a plurality of pulses.

20. The system of claim 1, wherein the optical arrangement is structured to aberrate the laser beam to form the laser beam focal line.

21. The system of claim 1, wherein the laser beam focal line comprises a pattern of light rays having a linear shape, parallel to a beam axis of the laser beam.

22. The system of claim 1, wherein the laser beam focal line comprises aberrated light rays that cross a beam axis of the pulsed laser beam at different positions along the beam axis.

23. The system of claim 1, wherein the laser beam focal line comprises a length l that is greater than an average diameter δ of the laser beam focal line.

24. The system of claim 6, wherein the diaphragm comprises a diameter that is 75% of a diameter of the second, focusing optical element.

25. The system of claim 1, wherein an average diameter δ of the laser beam focal line is between 0.5 μm and 5 μm.

26. The system of claim 1, wherein the first optical element and the second optical element are positioned and directed such that the laser beam strikes the second optical element in a collimated ring shape.

27. The system of claim 1, wherein the laser comprises a non-ablative laser.

28. A system comprising:
a substrate; and
a device for laser-based machining, the device comprising:
a laser providing a laser beam of wavelength λ, such that a material of the substrate is transparent to the wavelength λ, a decrease in intensity of the laser beam taking place along the direction of the laser beam in the material of the substrate per millimeter of the depth of penetration is 10% or less,
an optical arrangement which is positioned in a path of rays of the laser beam, wherein:
the optical arrangement comprises a first optical element and a second, focusing optical element disposed on the beam output side of the first optical element at a distance z1 from the first optical element; and
the first optical element and the second, focusing optical element are positioned and directed such that the laser beam strikes the second, focusing optical element is a ring shape, and a laser beam focal line extending along the direction of the laser beam is generated on the beam output side of the second, focusing optical element at a spacing z2 from the second, focusing optical element;
wherein:
the substrate comprises two opposite substrate surfaces and is positioned in relation to the laser beam focal line such that an extended segment of the induced absorption takes place in the material of the substrate along a single continuous cracking zone, such that induced crack formation is brought about in the material of the substrate along the extended segment of induced absorption;
the laser beam focal line extends up to at least one of the two opposite substrate surfaces,
the average diameter δ of the laser beam focal line is between 0.5 μm and 5 μm, and
the average laser power, measured directly on the output side of the laser beam is between 10 watts and 100 watts.

29. The system of claim 28, wherein the first optical element comprises a non-spherical free surface.

30. The system of claim 29, wherein the first optical element with a non-spherical free surface is a conical prism or axicon.

31. The system of claim 28, wherein the device for laser based machining further comprises a third optical element, which is positioned between the first optical element and the second, focusing optical element in the path of rays of the laser beam, wherein the third optical element comprises a collimation lens.

32. The system of claim 28, wherein the laser beam is a burst pulse laser beam, with each burst pulse comprising a plurality of pulses.

33. The system of claim 32, wherein the burst pulse has a repetition frequency in a range of between 10 kHz and 1000 kHz.

34. The system of claim 28, wherein the optical arrangement is structured to aberrate the laser beam to form the laser beam focal line.

35. The system of claim 28, wherein the laser beam focal line comprises a pattern of light rays having a linear shape, parallel to a beam axis of the laser beam.

36. The system of claim 28, wherein the laser beam focal line comprises aberrated light rays that cross a beam axis of the pulsed laser beam at different positions along the beam axis.

37. The system of claim 28, wherein the laser beam focal line comprises a length l that is greater than the average diameter δ of the laser beam focal line.

38. The system of claim 28, wherein the first optical element and the second, focusing optical element are positioned and directed such that the laser beam strikes the second, focusing optical element in a collimated ring shape.

39. The system of claim 28, wherein the laser comprises a non-ablative laser.

* * * * *

UNITED STATES PATENT AND TRADEMARK OFFICE
CERTIFICATE OF CORRECTION

| | | |
|---|---|---|
| PATENT NO. | : 11,028,003 B2 | Page 1 of 2 |
| APPLICATION NO. | : 14/761275 | |
| DATED | : June 8, 2021 | |
| INVENTOR(S) | : Richard Grundmueller et al. | |

It is certified that error appears in the above-identified patent and that said Letters Patent is hereby corrected as shown below:

On the Title Page

On page 3, in Column 1, item (56), U.S. Patent Documents, Line 3, delete "Gamer" and insert -- Garner --, therefor.

On page 4, in Column 2, item (56), Foreign Patent Documents, Line 5, delete "3609978" and insert -- 0609978 --, therefor.

On page 5, in Column 2, item (56), Other Publications, Line 23, delete "551-654;" and insert -- 651-654; --, therefor.

On page 5, in Column 2, item (56), Other Publications, Line 39, delete "Culling" and insert -- Cutting --, therefor.

On page 6, in Column 1, item (56), Other Publications, Line 32, delete "396711-1" and insert -- 896711-1 --, therefor.

On page 6, in Column 1, item (56), Other Publications, Lines 38-39, delete "Eelectropolishing;" and insert -- Electropolishing; --, therefor.

On page 6, in Column 2, item (56), Other Publications, Line 7, delete "Optic Letters," and insert -- Optics Letters, --, therefor.

On page 6, in Column 2, item (56), Other Publications, Line 9, delete "EuropeTec" and insert -- EuropTec --, therefor.

On page 6, in Column 2, item (56), Other Publications, Line 18, delete "Optic Letters," and insert -- Optics Letters, --, therefor.

On page 6, in Column 2, item (56), Other Publications, Line 32, delete "pluse" and insert -- pulse --, Signed and Sealed this
Seventh Day of September, 2021

Drew Hirshfeld
*Performing the Functions and Duties of the
Under Secretary of Commerce for Intellectual Property and
Director of the United States Patent and Trademark Office* therefor.

On page 6, in Column 2, item (56), Other Publications, Line 40, delete "URL" and insert -- UCRL --, therefor.

In the Specification

In Column 1, Line 12 (approx.), delete "2015," and insert -- 2013, --, therefor.